(12) United States Patent
Miida et al.

(10) Patent No.: US 7,340,501 B2
(45) Date of Patent: Mar. 4, 2008

(54) SYSTEM, METHOD, APPARATUS AND PROGRAM FOR COLLECTING AND PROVIDING INFORMATION

(75) Inventors: Tetsuya Miida, Tokyo (JP); Yayoi Katagiri, Saitama (JP); Hiroshi Nishida, Kanagawa (JP); Takehiro Nishiura, Tokyo (JP); Eiji Shinohara, Kanagawa (JP); Tatsuto Torikai, Kanagawa (JP); Hiroshi Hosoda, Kanagawa (JP); Keisuke Kataoka, Kanagawa (JP); Sachiko Misumi, Tokyo (JP); Atsushi Hanai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 566 days.

(21) Appl. No.: 09/983,532

(22) Filed: Oct. 24, 2001

(65) Prior Publication Data

US 2002/0049839 A1   Apr. 25, 2002

(51) Int. Cl.
*G06F 17/30* (2006.01)
*G06F 15/16* (2006.01)

(52) U.S. Cl. .................. 709/203; 709/224; 709/228; 707/1; 707/3; 711/212

(58) Field of Classification Search .............. 709/224, 709/15, 220, 228, 227, 203, 223; 705/10; 358/1.13; 707/1, 2, 3, 5; 711/121
See application file for complete search history.

(56) References Cited

U.S. PATENT DOCUMENTS

| | | | |
|---|---|---|---|
| 4,583,834 A * | 4/1986 | Seko et al. ............... 399/8 |
| 4,766,548 A * | 8/1988 | Cedrone et al. ........ 700/236 |
| 5,095,331 A | 3/1992 | Takano |
| 5,224,157 A * | 6/1993 | Yamada et al. ...... 379/100.05 |
| 5,243,382 A * | 9/1993 | Takano et al. ............. 399/8 |
| 5,291,302 A * | 3/1994 | Gordon et al. .......... 358/400 |
| 5,361,265 A * | 11/1994 | Weinberger et al. ...... 714/47 |
| 5,363,204 A * | 11/1994 | Millman .................. 358/406 |

(Continued)

FOREIGN PATENT DOCUMENTS

EP    0 598 504    5/1994

(Continued)

OTHER PUBLICATIONS

Japanese Office Action dated Mar. 13, 2007 and Apr. 17, 2007, directed to counterpart JP application Nos. 2000-328810 and 2000-324324.

(Continued)

*Primary Examiner*—Khanh Dinh
(74) *Attorney, Agent, or Firm*—Morrison & Foerster LLP

(57) ABSTRACT

A transmission device sends status information representing status of a copier to a center through a PSTN. In the center, the status information of each copier is analyzed, and suggestion information selected based on a result of the analysis is provided to a terminal of the user of the copier concerned. In this case, the user is informed by an e-mail or through a Web page with using the terminal. The information includes: a suggestion to multiply the copier, replace the currently-used copier with a new copier, performance information regarding a model of the currently-used copier, information regarding a timing for replenishing/replacing an expendable supply (such as a toner unit, etc.), a suggestion to purchase the expendable supply, and the like.

6 Claims, 31 Drawing Sheets

U.S. PATENT DOCUMENTS

| | | | |
|---|---|---|---|
| 5,835,816 A * | 11/1998 | Sawada et al. | 399/8 |
| 5,923,834 A * | 7/1999 | Thieret et al. | 714/25 |
| 6,317,823 B1 * | 11/2001 | Wakai et al. | 712/220 |
| 6,507,409 B2 * | 1/2003 | Kawaguchi | 358/1.16 |
| 6,564,202 B1 * | 5/2003 | Schuetze et al. | 707/2 |
| 6,631,247 B1 * | 10/2003 | Motoyama et al. | 399/8 |
| 6,771,385 B1 * | 8/2004 | Iizuka et al. | 358/1.15 |
| 2002/0162056 A1 * | 10/2002 | Forman et al. | 714/46 |

FOREIGN PATENT DOCUMENTS

| | | |
|---|---|---|
| EP | 0 965 908 | 12/1999 |
| JP | 06-083838 | 3/1994 |
| JP | 8-211792 | 8/1996 |
| JP | 2000-49998 | 7/1998 |
| JP | 10-312427 | 11/1998 |
| JP | 11-7472 | 1/1999 |
| JP | 11-32069 | 2/1999 |
| JP | 11-161451 | 6/1999 |
| JP | 11-250159 | 9/1999 |
| JP | 2000-81960 | 3/2000 |
| JP | 2000-82095 | 3/2000 |
| JP | 2000-123023 | 4/2000 |
| JP | 2000-298691 | 10/2000 |

OTHER PUBLICATIONS

Hashimoto, (2000) "Opt-in-Mail Advertisement Service", *Nikkei Net Business, Nikkei Business*.

Yoshikawa (2000) "Customer-Grabbing Web Marketing Moving Into High Gear!" *Nikkei Information Strategy*, Japan, *Nikkei Business Publication, Inc.*9(7):. pp. 76-84.

Hitachi, Ltd. Customer-Oriented Marketing: Hitachi Front Office Solution Cyber Office, Haitakku, Hitachi, Ltd., Feb. 1, 1999, pp. 12-16.

Japanese Office Action dated Aug. 7, 2007, directed to counterpart JP application No. 2000-328810.

Japanese Office dated Sep. 25, 2007, directed to counterpart JP application No. 2000-324324.

* cited by examiner

FIG. 3

| | |
|---|---|
| PAGES OF ORIGINAL | 500 |
| TOTAL COPY AMOUNT | 600 |

| DATE | 2000/09/01 |
|---|---|
| MODEL | A001 |
| SERIAL NO. | 122512 |

| ITEM | | AMOUNT | RATE (%) |
|---|---|---|---|
| COPY AMOUT (PAPER SIZE) | A3 | 150 | 32.5% |
| | B4 | 130 | 28.1% |
| | A4 | 120 | 26.0% |
| | B5 | 50 | 10.8% |
| | OTHERS | 12 | 2.6% |
| | TOTAL | 462 | 100.0% |

| ITEM | | AMOUNT | RATE (%) |
|---|---|---|---|
| COPY AMOUT (PAPER TRAY FEED) | 1ST FEED | 150 | 31.9% |
| | 2ND FEED | 120 | 25.5% |
| | 3RD FEED | 100 | 21.3% |
| | 4TH FEED | 60 | 12.8% |
| | BY-PASS | 40 | 8.5% |
| | DUPLEX | 0 | 0.0% |
| | LCT | 0 | 0.0% |
| | TOTAL | 470 | 100.0% |

| ITEM | | AMOUNT | RATE (%) |
|---|---|---|---|
| EDIT | OUTSIDE | 20 | — |
| | INSIDE | 10 | — |
| ERASE | BORDER | 50 | — |
| | CENT./BORD. | 100 | — |
| | CENTERING | 50 | — |

| DUPLEX/ BOOK/SERIES/ COMBINE | AMOUNT | RATE (%) |
|---|---|---|
| 1SIDED->2SIDED | 100 | 0.36 |
| 2SIDED->2SIDED | 100 | 0.36 |
| BOOK->2SIDED | 20 | 0.07 |
| BOOK->BOOK | 30 | 0.11 |
| 2SIDED->1SIDED | 5 | 0.02 |
| BOOK->1SIDED | 12 | 0.04 |
| 2SIDED->BOOK | 5 | 0.02 |
| 1SIDED->BOOK | 3 | 0.01 |
| 1SIDED->BOOK (2) | 0 | 0 |

| STAPLING | AMOUNT | RATE (%) |
|---|---|---|
| POSITION 1 | 200 | 54.1% |
| POSITION 2 | 100 | 27.0% |
| BOTH SIDES | 50 | 13.5% |
| SLANT | 20 | 5.4% |
| TOTAL | 370 | 100.0% |

| MODE 1 | AMOUNT | RATE (%) |
|---|---|---|
| COVER | 150 | — |
| CHAPTER | 20 | — |
| SLIP SHEET | 70 | — |

| MODE 2 | AMOUNT | RATE (%) |
|---|---|---|
| DF-ON | 210 | — |
| SORT | 100 | — |
| STACK | 50 | — |
| SORT/STACK | 20 | — |

| PUNCHING | | |
|---|---|---|
| | 400 | — |

| REDUCE/ ENLARGE | AMOUNT | RATE (%) |
|---|---|---|
| FULL SIZE | 400 | 0.0% |
| REDUCE | 50 | 0.0% |
| ENLARGE | 50 | 0.0% |
| TOTAL | 500 | 0.0% |

| COMPANY ID | MODEL ID | SECTION | E-MAIL ADDR. | PASSWORD | USER ATTRIBUTE |
|---|---|---|---|---|---|
| AA | A001 (1224) | GENRAL AFFAIRS SECT. | a@aa.++.jp | ******** | KEY OPERATOR |
| | | | b@aa.++.jp | ******** | ORDINARY USER |
| | | | c@aa.++.jp | ******** | ORDINARY USER |
| | A005 (1225) | PLANNING SECT. | d@aa.++.jp | ******** | PURCHASER |
| | | | e@aa.++.jp | ******** | ORDINARY USER |
| BB | A001 (3440) A002 (3441) | ACCOUNT SECT. | a@bb.++.jp | ******** | KEY OPERATOR |
| | | | b@bb.++.jp | ******** | ORDINARY USER |
| | | MATERIAL | c@bb.++.jp | ******** | ORDINARY USER |
| ⋮ | ⋮ | ⋮ | ⋮ | ⋮ | ⋮ |

*FIG. 4*

| MODEL: A001 ||
|---|---|---|
| FUNCTION | SPEC. ||
| FEEDER | MODE | ADF MODE, . . . |
| | ORG. SIZE | A3-B6, DLT, . . . |
| | MAX | 50 PAGES |
| ⋮ | ⋮ | ⋮ |
| FINISHER | TRAY | PAPER SIZE: . . . |
| | STAPLE | PAPER SIZE: . . . |
| | PUNCH | — |

*FIG. 5*

Subject: Notice for Toner Replenishment
Date: Jan 1, 2001
To: a@aa.++.jp
From: supply@##.co.jp Dear Mr. **:

Please be informed that the tonner unit in your copier will be exhausted soon (within about 1 week). Prepare new one for replenishment before exhaustion.

*FIG. 20*

Subject: Notice for Toner Replenishment
Date: Jan 1, 2001
To: d@aa.++.jp
From: supply@##.co.jp Dear Ms. **:

Please be informed that the tonner unit in your copier will be exhausted soon (within about 1 week).
Check your inventory and prepare new one for replenishment if necessary.

*FIG. 21*

Subject: Notice for Tonner Replenishment
Date: Jan 1, 2001
To: d@aa.++.jp
From: supply@##.co.jp Dear Ms. **:

Please be informed that the tonner unit in your copier will be exhausted soon (within about 1 week).
Check your inventory and prepare new one for replenishment if necessary.

Replenishment supplies are available at:
http://www.order.##.jp

FIG. 29

SYSTEM, METHOD, APPARATUS AND PROGRAM FOR COLLECTING AND PROVIDING INFORMATION

BACKGROUND OF THE INVENTION

1. Field of the Invention

The present invention relates to a system, method, apparatus and program for collecting and providing information, and, more particularly, to a system, method, apparatus and program for collecting status information of products and providing suggestion information in accordance with the status information.

2. Description of the Related Art

There are known systems for collecting information representing, for example, the status of an image data processor (such as a copier) through a communications network (such as a Public Switched Telephone Network or APSTN@). In such a system a center collects, customer by customer, information representing the number of documents to be copied and the number of papers used for copying. The collected information is usually used for calculating the maintenance service charge for the copiers.

A technique to which the above system is applied is disclosed in Unexamined Japanese Patent Application KOKAI Publication No. 2000-49998. According to this technique, an image formation device may obtain information regarding an optional function from a center. Thus, a user can test the optional function or update the software before using the optional function.

In the above technique, the center provides the user with information regarding the optional function only when the user requests such information. Therefore, this known technique is not suitable for situations in which the manufacturer or vender may want to voluntarily present or suggest information. Further, the technique is applicable to the case where to update the currently-used image formation device without replacing it with another device.

SUMMARY OF THE INVENTION

The present invention has been made in consideration of the above. It is accordingly an object of the present invention to provide a system, method, apparatus and program for collecting and providing information, and for effectively providing customers with recommendation information with ease.

Another object thereof is to provide a system, method, apparatus and program for collecting and providing information so as to easily provide users with adequate expendables, and for securely informing users about an adequate time for replacing a currently-used expendable with a new expendable based on collected status information.

To achieve the above objects, an information collecting and providing system according to a first aspect of the present invention comprises:

information collection means for collecting status information sets representing status of products used by customers;

storage means for storing recommendation information sets representing recommendations relating to the products;

selection means for selecting the recommendation information sets stored in the recommendation-information storage means, based on the status information set of the customer collected by the information collection means; and information presentation means for presenting the recommendation information sets selected by the recommendation-information selection means to the customer.

According to the above structure, a customer user who uses the product is provided with appropriate recommendation information regarding the product based on the status of the product.

To achieve the above objects, an information collecting/providing system according to a second aspect of the present invention comprises:

a status-information transmitter which transmits status information representing status of a product used by a customer, to a center;

a customer-information storage unit which stores customer information;

a recommendation-information storage unit which stores recommendation information sets representing recommendations relating to the products;

a status-information collector which collects and stores the status information sets transmitted by the status-information transmitters;

a recommendation-information selector which selects recommendation information sets stored in the recommendation-information storage unit, based on the status information set collected by the status-information collector; and a recommendation-information providing unit which provides a customer terminal of a customer corresponding to the status information set with the recommendation information sets selected by the recommendation-information selector.

According to the above structure, the center of a company manufacturing and/or vending the product collects information representing the status of the product used by the customer, and sends information representing recommendation matters based on the status to a user terminal such as a personal computer, used by the customer. Thus, the company (manufacturer and/or vendor) can effectively provide the customer with various recommendation matters. At the same time, the customer easily obtains the useful information.

The center may include:

a request receiver which receives a request signal from the customer terminal; and a customer authenticator which identifies a customer having sent the request signal received by the request receiver, based on the customer information stored in the customer-information storage unit, and wherein the recommendation-information selector may select recommendation information, based on the status information corresponding to the customer identified by the customer authenticator.

According to this structure, the center may establish a Web site. When the customer accesses the Web site, the center can automatically provide the customer with recommendation information based on the status of the product used by the customer, through the Web site.

The information collecting/providing system, may further comprise a status analyzer which analyzes the status information, and wherein the recommendation-information selector may select the recommendation information based on a result of analysis done by the status analyzer.

According to this structure, recommendation information can be provided to the customer in accordance with the status of the product used by the customer.

In the information collecting/providing system, the status information may represent the usage frequency of each function of the product, and the recommendation-information selector may refer to the status information to find out the most frequently used function, and may select recommendation information set in consideration of the function concerned.

In this case, the recommendation-information selector may select the recommendation information set recommending a product which is advanced in the function concerned.

According to the above structure, of functions in the product used by the customer, the center analyzes which function is the most frequently used function. And, the center provides the customer with information recommending another product which is advanced in that function than the product being used by the customer.

In the information collecting/providing system, the status information may represent the usage frequency of each function of the product, and the recommendation-information selector may refer to the status information to find out the least frequently used function, and may select the recommendation information set in consideration of the function concerned.

In this case, the recommendation-information selector may select the recommendation information set representing how to use the function concerned.

According to this structure, the center analyzes which function is the least frequently used function. And, the customer is provided with information representing how to use that function, in order to promote the usage of the function for more convenience, efficiency, and the like.

In the information collecting/providing system, the status information may represent consumption of expendable units in the products, the system may further include a consumption analyzer which analyzes the consumption of the expendable units which is shown in the status information, and the recommendation-information selector may select the recommendation information sets, based on a result of analysis done by the consumption analyzer.

According to this structure, if the product includes expendable units, then the center analyzes consumption of those expendable units. And, the center provides the customer with the information representing that the expendable unit should be recharged or replaced with a new one.

To achieve the above objects, an information collecting/providing system according to a third aspect of the present invention comprises:

an information collector which collects status information representing consumption of expendable units used in an image data processor through a communications network;

a consumption analyzer which analyzes the consumption of the expendable units shown in the status information collected by the information collector, and determines whether the expendable unit should be recharged or replaced with new expendable unit;

a consumption indicator, being connected to terminals used by the users of the image data processors through a communications network, which indicates on the terminal that there is the expandable which should be recharged or replaced based on the determination by the consumption analyzer.

According to this structure, information representing the consumption of the expendable unit (such as a toner unit, sheets, or the like in the image data processor such as a copier) can be collected using a communications network, for example, PSTN. The collected information is analyzed. If the analysis result indicates that the expendable unit should be recharged or replaced with a new one, then information representing the analysis result is transmitted to a user terminal such as a personal computer, cellular phone, and mobile communications terminal used by the user of the image data processor. The information may be transferred through a communications network such as the Internet in the form of an e-mail or a Web page. Therefore, the user is able to know an adequate timing for recharging or replacing the expendable unit.

In the information collecting/providing system, the consumption indicator may provide the user with information representing order form for buying a new expendable unit with indicating that the expendable unit should be replaced with a new expendable unit.

According to this structure, when the customer is informed that the expendable unit should be recharged or replaced by e-mail or the Web page, information on the e-mail or Web page is linked to a Web page providing an order form for purchasing the expendable unit. This enables the user to easily purchase the expendable at an adequate timing. In this case the manufacturer and/or vendor can promote usage of genuine expandable units to the customers.

To achieve the above objects, a method for collecting/providing information according to a fourth aspect of the present invention comprises:

collecting status information representing status of products possessed by customers;

storing recommendation information sets each representing recommendation in accordance with the status of the product;

selecting the recommendation information stored at the recommendation information storing step, based on the status information collected at the information collecting step; and providing the recommendation information selected at the recommendation information selecting step, to the customer.

To achieve the above objects, a method for collecting/providing information according to a fifth aspect of the present invention, comprises:

storing customer information;

collecting status information representing status of products used by customers registered in the customer information stored at the customer-information storing step, through a communications network;

storing recommendation information representing a recommendation to be given to the customer;

selecting the recommendation information stored at the recommendation-information storing step, based on the status information collected at the information collecting step; and providing the customer with the recommendation information selected at the recommendation-information selecting step, through a communications network.

The method may further comprise:

receiving a request signal for requesting recommendation information, from a customer terminal of the customer; and specifying the customer having sent the request signal received in the request-information receiving step, based on the customer information stored in the customer-information storing step, and wherein the recommendation-information selecting step may select recommendation information, based on status information of the product used by the customer specified in the customer-specifying step.

The method may further comprise analyzing the status information, and wherein the recommendation-information selecting step may select recommendation information based on a result of analysis done in the status analyzing step.

In the method, the status information may represent the usage frequency of each function of the product; and the recommendation-information selecting step may refer to the status information to find out the most frequently used function, and may select the recommendation information set in consideration of the function concerned.

In the method, the recommendation-information selecting step may select the recommendation information set representing a product which is advanced in the function concerned.

In the method, the status information may represent the usage frequency of each function of the product, and the recommendation-information selecting step may refer to the status information to find out the least frequently used function, and may select the recommendation information set in consideration of the function concerned.

In the method, the recommendation-information selecting step may select the recommendation information set representing how to use the function concerned.

In the method, the status information may represent consumption of expendable units in the products, the method may further include the consumption analyzing step which analyzes the consumption of the expendable units which is shown in the status information, and the recommendation-information selecting step may select the recommendation information sets, based on a result of analysis done at the consumption analyzing step.

To achieve the above objects, an apparatus for collecting/providing information according to a sixth aspect of the present invention comprises:

a connector for connecting the apparatus to a communications network;

a customer-information storage unit which stores customer information including information regarding customers and information representing products used by the customers, in association with each other;

a recommendation-information storage unit which stores recommendation information sets each representing recommendation to be given to the customers;

a receiver which controls the connector to receive status information representing status of the product used by the customer shown in the customer information stored in the customer-information storage unit;

a status-information storage unit which stores the status information received by the recipient;

a request receiver which controls the connector to receive a request signal for requesting the recommendation information, from a customer terminal;

a customer-authentication unit which specifies a customer having sent the request signal received by the request receiver, based on the customer information stored in the customer-information storage unit;

a status analyzer which retrieves status information of the product used by the customer specified by the customer-authentication unit from the status-information storage unit, and analyzes the retrieved status information;

a recommendation-information selector which selects the recommendation information sets from the recommendation-information storage unit, based on a result of the analysis done by the status analyzer; and a recommendation-information transmitter which controls the connector to transmit the recommendation information sets selected by the recommendation-information selector to the customer terminal.

In the apparatus, the status information may represent the usage frequency of each function of the product, the status analyzer may analyze status of the most frequently used function, and the recommendation-information selector may select recommendation information set representing a product which is advanced in the function concerned.

In the apparatus, the status information may represent the usage frequency of each function of the product, the status analyzer may analyze status of the least frequently used function, and the recommendation-information selector may select the recommendation information set representing how to use the function concerned.

In the apparatus, the product may be an image data processor, the apparatus may further include a product-information storage unit which stores product information including information representing performance level of the image data processor, the status information may represent the amount of process done by the image data processor, the status analyzer may analyze whether the amount of process is tolerable for the image data processor based on the performance level of the image data processor, and the recommendation-information selector may select the recommendation information set which recommends that the image data processor should be multiplied, in a case where the status analyzer indicates that the amount of process is intolerable for the image data processor.

In the apparatus, the product may be an image data processor, the apparatus may further include a product-information storage unit which stores product information including information representing performance level of the image data processor, the status information may represent the amount of process done by the image data processor, the status analyzer may analyze whether the amount of process is tolerable for the image data processor based on the performance level of the image data processor, and the recommendation-information selector may select the recommendation information set representing recommendation for upgrading the image data processor by replacing the image data processor with another image data processor which is advanced in consideration of the amount of the process.

In the apparatus, the product may be an image data processor, the status information may represent consumption of expendable units in the image data processor, the status analyzer may analyze the status information to determine whether the expendable should be replaced with a new expendable, and the recommendation-information selector may select the recommendation information set indicating that there is the expendable unit which should be replaced, and another recommendation information set representing an order form for buying a new expendable unit.

In the apparatus, the product may be an image data processor, the status information may represent consumption of expendable units in the image data processor, the status analyzer may analyze the status information to determine whether the expendable unit should be replaced with a new expendable unit, and the apparatus may further comprise an ordering unit which controls the connector to transmit order information to a vendor of the expendable unit, in a case where the result of analysis done by the status analyzer indicates that the expendable unit should be replaced with a new expendable unit.

A program which causes a computer to function as the above described apparatus.

BRIEF DESCRIPTION OF THE DRAWINGS

These and other objects and advantages of the present invention will become more apparent upon reading the following detailed description and the accompanying drawings in which:

FIG. 3 is a diagram showing an example of status information stored in a customer-information database shown in FIG. 2;

FIG. 4 is a diagram showing an example of information stored in a customer-ID database shown in FIG. 2;

FIG. 5 is a diagram showing an example of information stored in a product-information database shown in FIG. 2;

FIG. 20 is a diagram showing an example of an e-mail to be transmitted in an information providing process shown in FIG. 19;

FIG. 21 is a diagram showing another example of an e-mail to be transmitted in an information providing process shown in FIG. 19;

FIG. 29 is a diagram showing an example of an e-mail to be transmitted in an information providing process shown in FIG. 27;

DETAILED DESCRIPTION OF THE PREFERRED EMBODIMENTS

Preferred embodiments of the present invention will now be described with reference to the accompanying drawings.

First Embodiment

Figure 1:
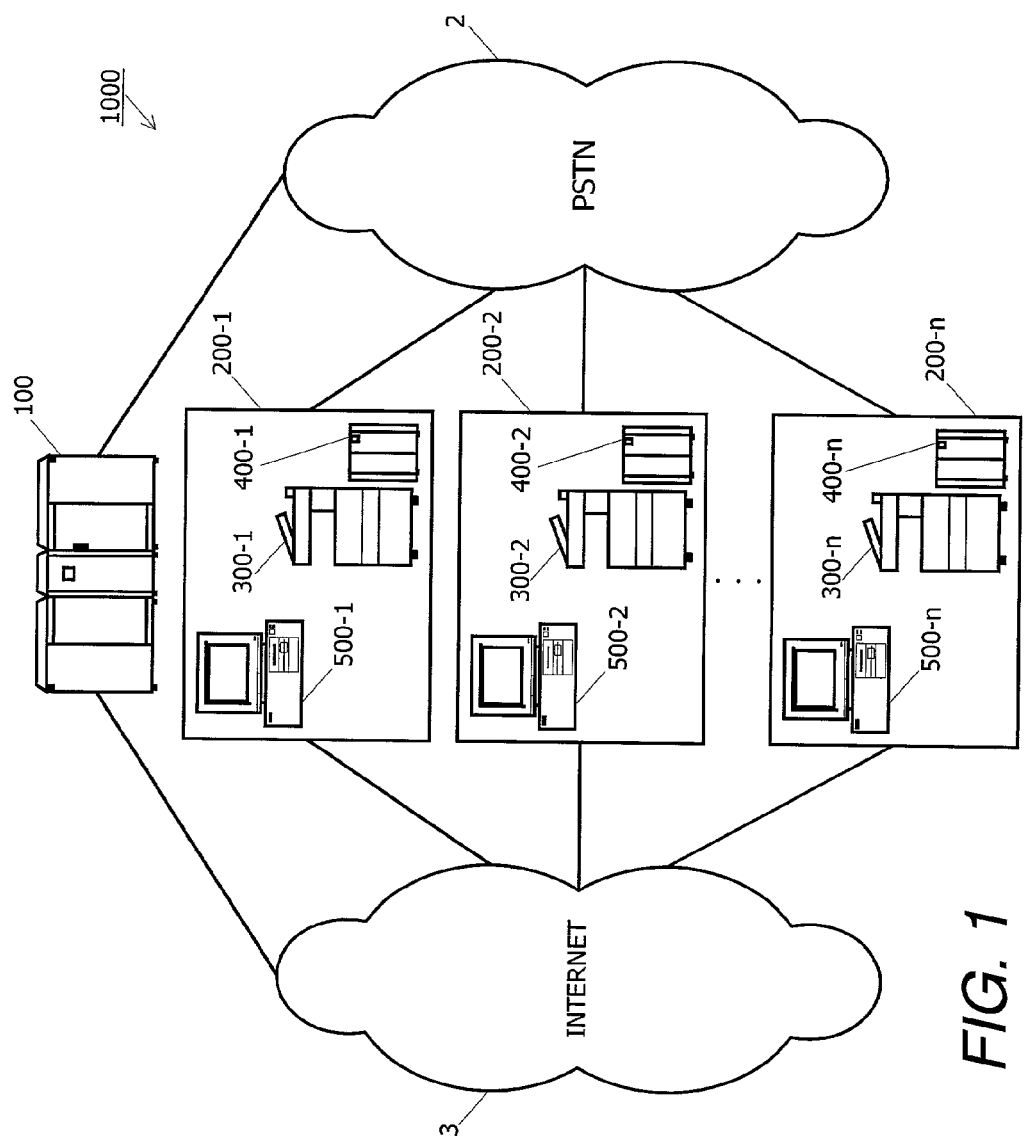
FIG. 1 is a diagram showing an example of a structure of an information collecting/providing system according to first and second embodiments of the present invention.

FIG. 1 is a diagram schematically showing an example of a structure of an information collecting/providing system according to a first embodiment of the present invention. In this embodiment, a copier is an example of the product concerned. Explanation will now be made of a case in which information is collected from copiers installed in companies.

As illustrated in FIG. 1, in this embodiment an information collecting/providing system 1000 comprises a PSTN (Public Switched Telephone Network) 2, a communications network 3, a center 100, a plurality of copiers 300-1 to 300-n installed in a plurality of companies 200-1 to 200-n respectively, a plurality of transmission devices 400-1 to 400-n attached respectively to the plurality of copiers 300-1 to 300-n, and a plurality of terminals 500-1 to 500-n.

The PSTN 2 is an ordinary telephone line network, and transfers information sent from each of the transmission devices 400-1 to 400-n.

The communications network 3 intermediates the information transfer between the center 100 and the terminals 500-1 to 500-n. In this embodiment, the communications network 3 may be the Internet, hereinafter referred to as the Internet 3. The Internet 3 is accessible via one or more leased lines, PSTN, CATV (cable television, community antenna TV) network, mobile communications network, and various wire/wireless communications network, etc.

The center 100 includes a server managed by an organization (company) that makes and/or sells copiers 300. The center 100 collects information from the transmission devices 400-1 to 400n through the PSTN 2, and provides the terminals 500-1 to 500-n with various information through the Internet 3.

Figure 2:
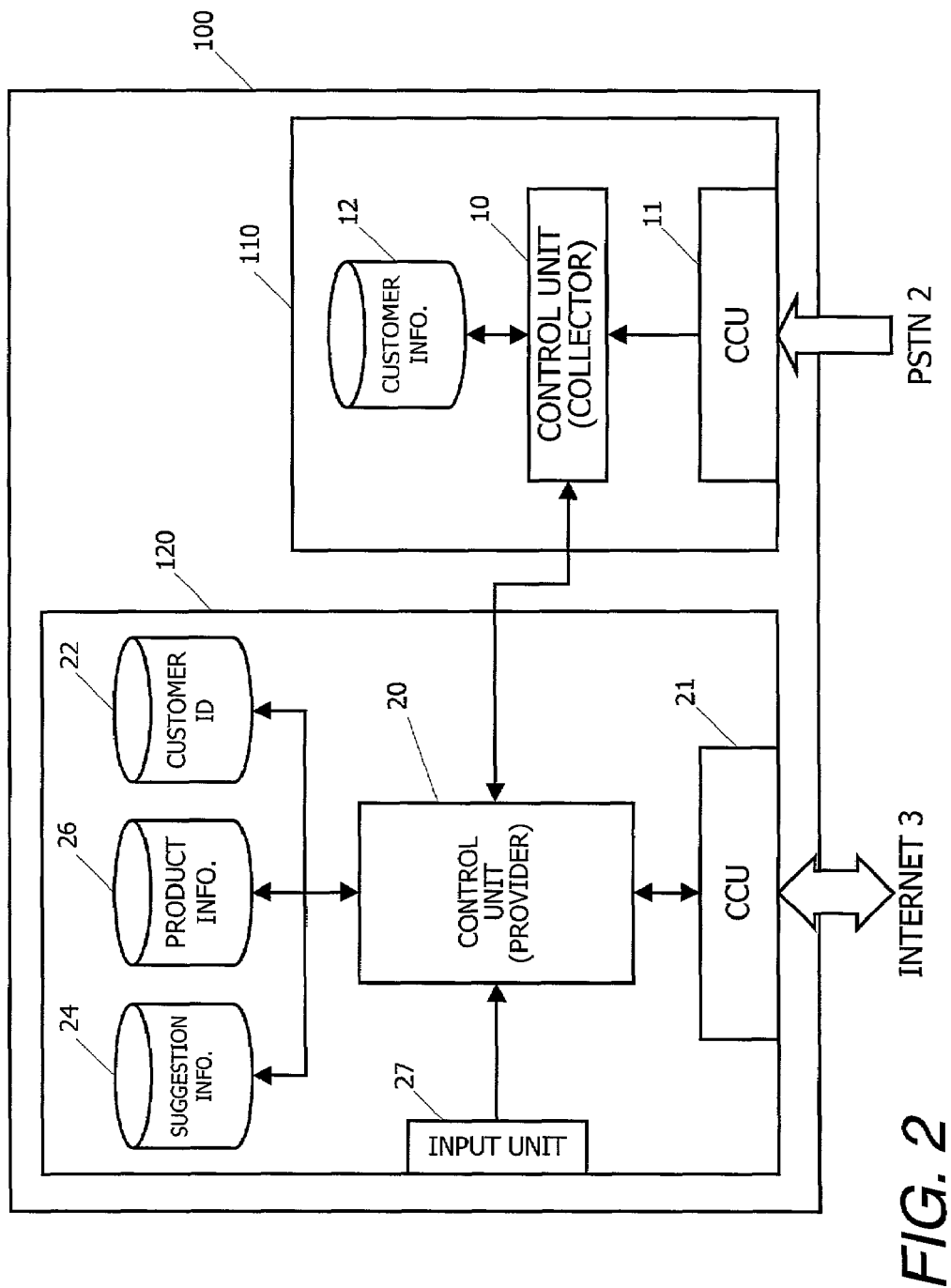
FIG. 2 is a block diagram schematically showing an example of a structure of a center shown in FIG. 1.

The structure of the center 100 will now be explained with reference to FIG. 2. FIG. 2 is a block diagram schematically showing an example of the structure of the center 100.

The center 100 is divided into two major components: an information collector 110 and an information provider 120.

The information collector 110 comprises a control unit (collector) 10, a CCU (Communication Control Unit) 11, and a customer-information database 12.

The control unit 10 maybe a CPU (Central Processing Unit) or the like which controls components in the information collector 110, and executes operational programs stored in a predetermined storage unit, such as a memory, etc., thereby to carry out an information collecting process, as will be explained later.

The CCU 11 is a communications device, such as a modem, TA (Terminal Adapter), etc. The CCU 11 connects the information collector 110 to the PSTN 2 and receives information representing the status of the copiers 300, as shown in FIG. 3, from the transmission devices 400.

As shown in FIG. 3, information representing the status of the copiers 300 may include the number of read papers and the number of copied papers. Specification information may include the number of papers used according to each paper size (Japanese standard paper size) and the percentage of executed optional operations, within a predetermined period.

The customer-information database 12 may be a rewritable memory unit, such as a hard disk drive, which stores the information representing the status of the copiers 300 received by the CCU 11. The status information is recorded customer by customer.

The information provider 120 comprises a control unit (provider) 20, a CCU (Communication Control Unit) 21, a customer-ID (identification information) database 22, a suggestion-information database 24, a product-information database 26, and an input unit 27.

The control unit 20 may be a CPU or the like. The control unit 20 controls components in the information provider 120, and executes operational programs stored in a predetermined storage section such as a memory, so as to realize a process for providing information, as will be explained later.

In particular, the CPU executes, as one of the operational programs, a program for realizing an operational mechanism such as CGI (Common Gateway Interface), and hence dynamically generating web page data to be provided to the terminals 500 through the Internet 3. Such program will be referred to as "CGI program". Further, the CPU executes a predetermined program for controlling the information provider 120 to serve as an e-mail server.

The CCU 21 is a communications device, such as a rooter, etc., which connects the information provider 120 to the Internet 3, and sends the web page data generated by the control unit 20 to the terminals 500.

The customer-ID database 22 may be a rewritable memory unit such as a hard disk drive, to which identification (ID) information for identifying customers is registered. In this embodiment, such ID information are given to predetermined individuals who belong to their corresponding one of the companies 200.

An example of the information registered in the customer-ID database 22 is shown in FIG. 4. As shown in FIG. 4, the customer-ID database 22 includes information representing "Company ID" for specifying one corresponding company of the companies 200, "Model ID" which is unique number for specifying the copier 300, "Section Name" of a section in the corresponding company where the copier 300 is installed, "E-mail Address" and "Password" of a predetermined individual in the section, and "User Attribute" representing an attribute of each user.

The suggestion-information database 24 may be a rewritable memory unit, such as a hard disk drive or the like. The suggestion-information database 24 stores suggestion files each representing predetermined suggestion comments in a fixed form.

The product-information database 26 may be a rewritable memory unit, such as a hard disk drive or the like. The product-information database 26 stores performance information sets as shown in FIG. 5. The information sets are prepared for various models of copiers dealt by the manufacturer and/or vendor which managing the center 100. The product-information database 26 also stores performance information of optional functions or peripheral devices prepared for each model.

The input unit 27 includes a keyboard, mouse, and the like. The input unit 27 is mainly used for editing (adding, updating, or deleting) information stored in the customer-ID database 22, suggestion-information database 24 and product-information database 26. For example, the input unit 27 is used when to add information regarding a newly-registered customer into the customer-ID database 22, and when to add product (item) information regarding a new product and its corresponding suggestion information in the product-information database 26 or suggestion-information database 24.

Each of the terminals 500 may be an information processor such as a personal computer, etc. Each of the terminals 500 includes at least a controller, a storage unit, a display unit, and a communications unit. According to the communications unit, the terminal 500 is able to access the center 100 through the Internet 3. Installed in the storage section of each terminal 500 are a mailer program for sending/receiving e-mails through the Internet 3, and a browser program for interpreting the web page data sent through the Internet 3 and displaying web pages on the display unit. The controller of the terminal 500 executes the programs so as to receive e-mails and web page data from the center 100. In this embodiment, each of the terminals 500 is installed in each company 200, and used by the individuals registered in the customer-ID database 22.

Figure 6:
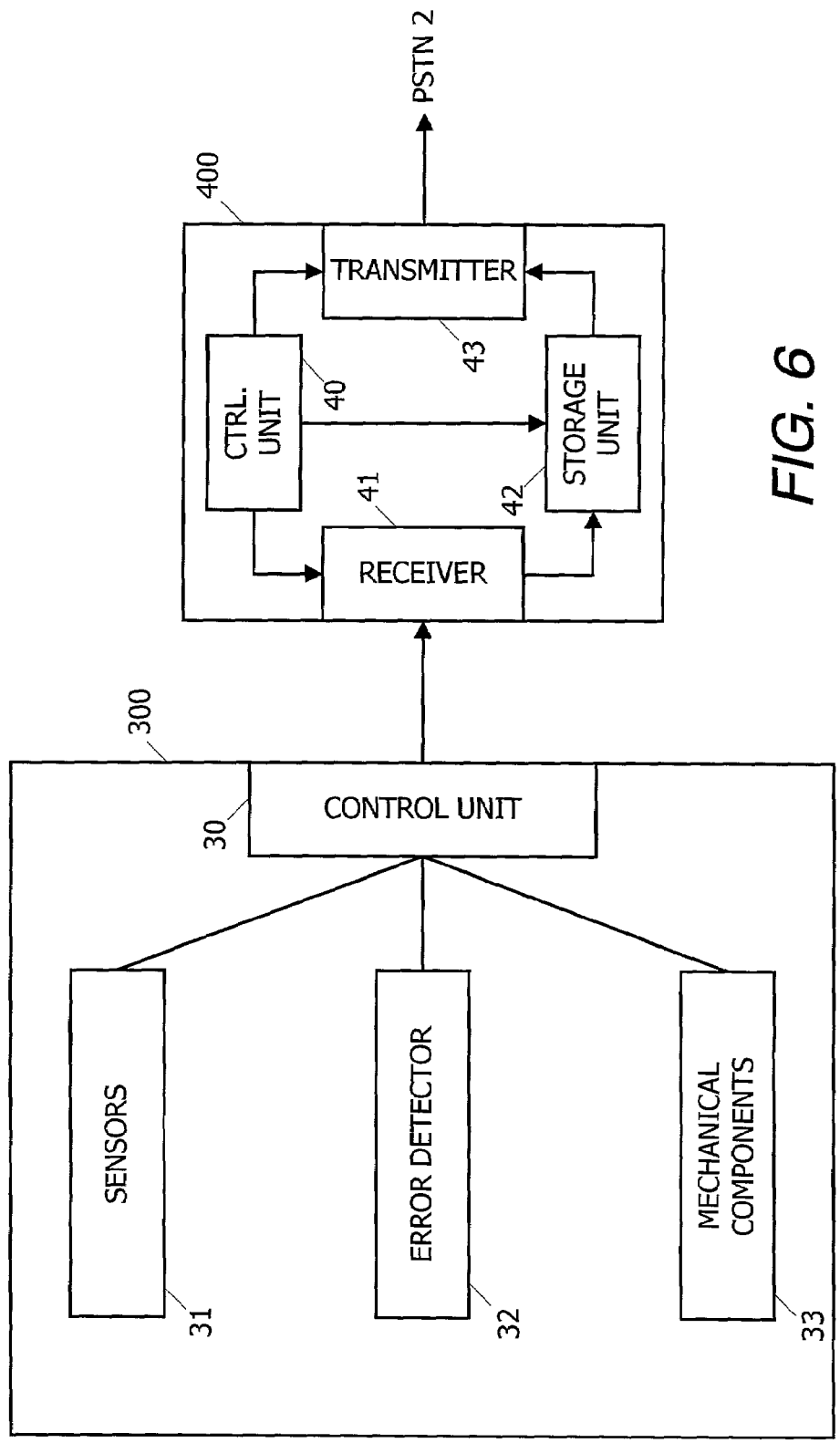
FIG. 6 is a block diagram schematically showing an example of a structure of a copier and a transmission device shown in FIG. 1.

The structures of the copier 300 and of the transmission device 400 which are installed in each company 200 will now be described with reference to FIG. 6. FIG. 6 is a block diagram schematically showing an example of the structures of the copier 300 and of the transmission device 400 according to the information collecting/providing system 1000 of the first embodiment.

The copier 300 comprises a control unit 30, various sensors 31, an error detector 32, and mechanical components 33.

The control unit 30 may be a CPU or the like, and controls components in the copier 300. The control unit 30 transmits, to the transmission devices 40, numeric data based on detection by the various sensors 31 and error detector 32, and information representing the status of the mechanical units 33 (hereinafter referred to as "status information").

The various sensors 31 detect the number of originals, the number of output sheets, the usage rates of paper cassettes each containing sheets, and the usage rate of toner, etc.

The error detector 32 detects any operational errors or troubles in the copier 300, for example, misfeeding or the like.

The mechanical units 33 include image forming mechanisms in the copier 300. Those are operated under control of the control unit 30 in accordance with an operational mode designated by a user.

The transmission device 400 comprises a control unit 40, a receiver 41, a storage unit 42, and a transmitter 43, as illustrated in FIG. 6.

The control unit 40 may be a CPU or the like, and controls components in the transmission device 400.

The recipient 41 receives status information sent from the control unit 30 of the copier 300.

The storage unit 42 may be a rewritable memory unit such as a hard disk drive, and stores the status information of the copier 300 which is received by the recipient 41 for a predetermined period of time.

The transmitter 43 connects the transmission device 400 to the PSTN 2, and sends the status information stored in the storage unit 42 to the center 100.

For the sake of comprehensive explanation, this embodiment exemplifies a case where one copier 300 is installed in the company while being connected to a single transmission device 400 by way of example. However, various configurations may be applicable. For example, a plurality of copiers 300 may be installed in the company 200 (or on the same floor of the company 200), or a plurality of copiers 300 may be connected to a single transmission device 400. This embodiment also exemplifies a case where the copier 300 and the transmission device 400 are separated. However, the copier 300 may include functions of the transmission device 400.

Figure 7:
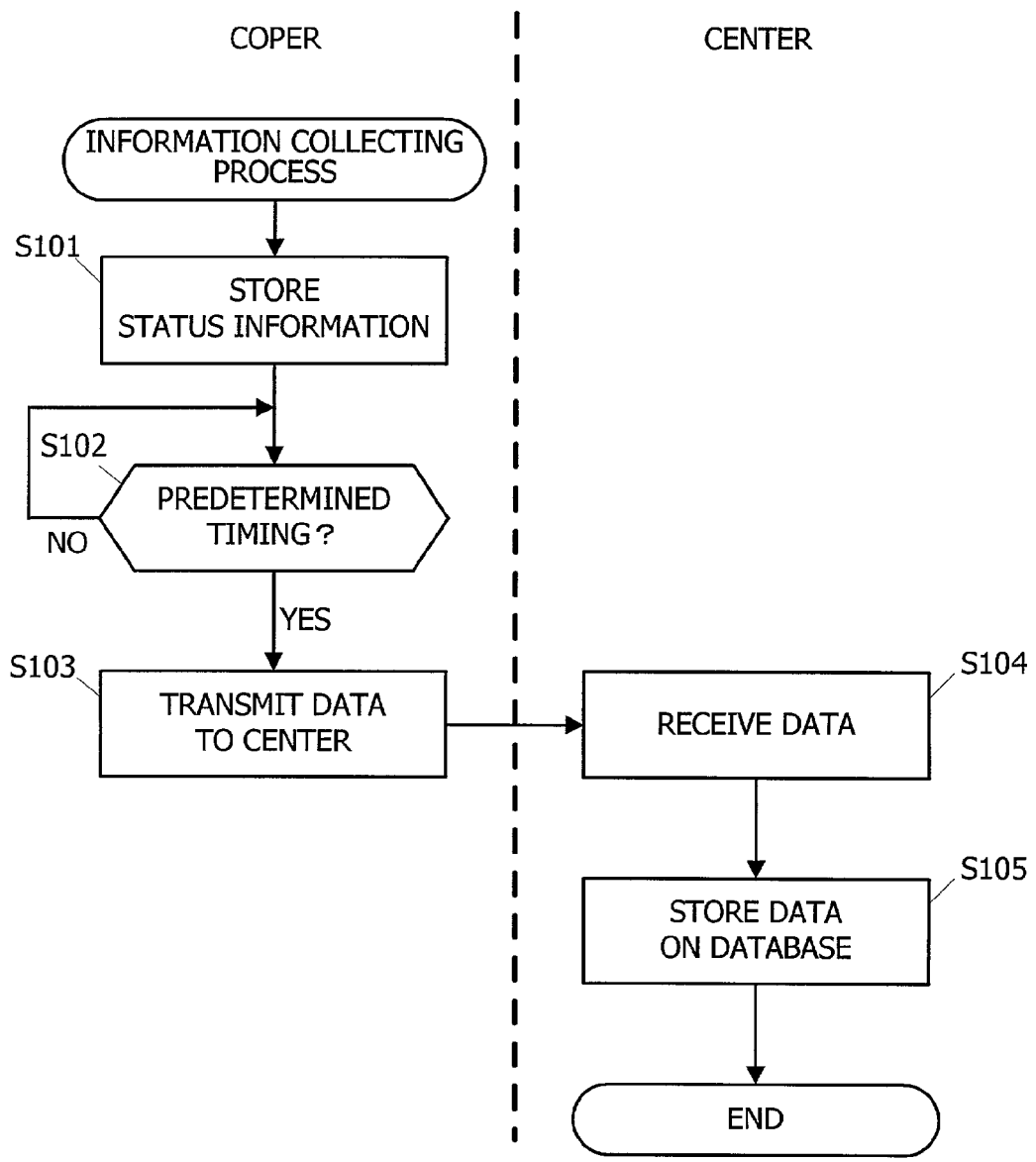
FIG. 7 is a flowchart for explaining an information collecting process carried out by a system according to a first embodiment of the present invention.

Processes carried out by the information collecting/providing system 1000 according to this embodiment will now be explained with reference to FIG. 7.

The control unit 30 of each copier 300 sends any signals detected in each operation by the various sensors 31 and/or error detector 32 and information representing operations of the mechanical units 33 (those signals and information will referred to as "status information"), to the transmission device 400.

The control unit 40 of the transmission device 400 controls the storage unit 42 to store the status information of the copier 300 received by the recipient 41 (Step S101).

The control unit 40 controls the transmitter 43, and sends the status information stored in the storage unit 42 to the center 100 through the PSTN 2 at a predetermined interval (Step S102: YES, S103).

In the center 100, the CCU 11 of the information collector 110 receives the status information sent from the transmitter 43 of the transmission device 400, and stores the received information in the customer-information database 12 (Steps S104, S105). At this time, the received information is stored in the customer-information database 12 and classified customer by customer, and the process is terminated.

Figure 8:
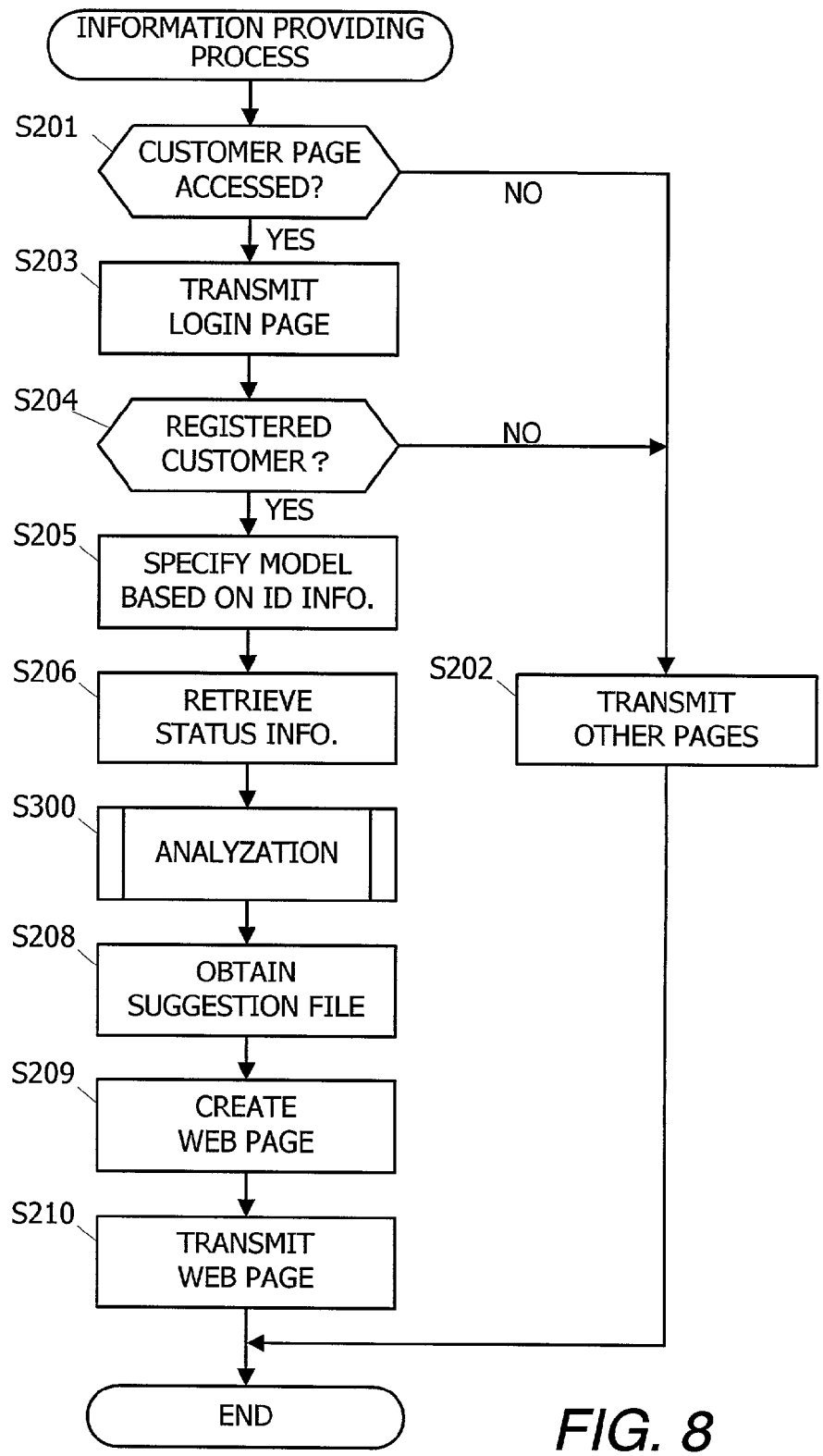
FIG. 8 is a flowchart for explaining an information providing process carried out by a system according to a first embodiment.

The information providing process which is carried out by the center 100 according to this embodiment will now be explained with reference to the flowchart shown in FIG. 8.

In this embodiment, the company (manufacturer and/or vendor of the copier 300) establishes a Web site on the Internet 3 for providing information regarding the company. This Web site is created and provided by the information provider 120 of the center 100. Most of the pages in the Web site are accessible by anybody via the Internet 3, but there are pages which limit the users to registered customers of the copier 300 (hereinafter referred to as "customer page").

A top page (homepage) of the Web site may include text or an image linked to the customer page. It is determined whether or not a request for accessing the customer page is given by determining whether the text or image is clicked by a user (Step S201).

In a case where the customer page is not requested, other general pages are presented to users (Step S201: No, S202).

Figure 9:
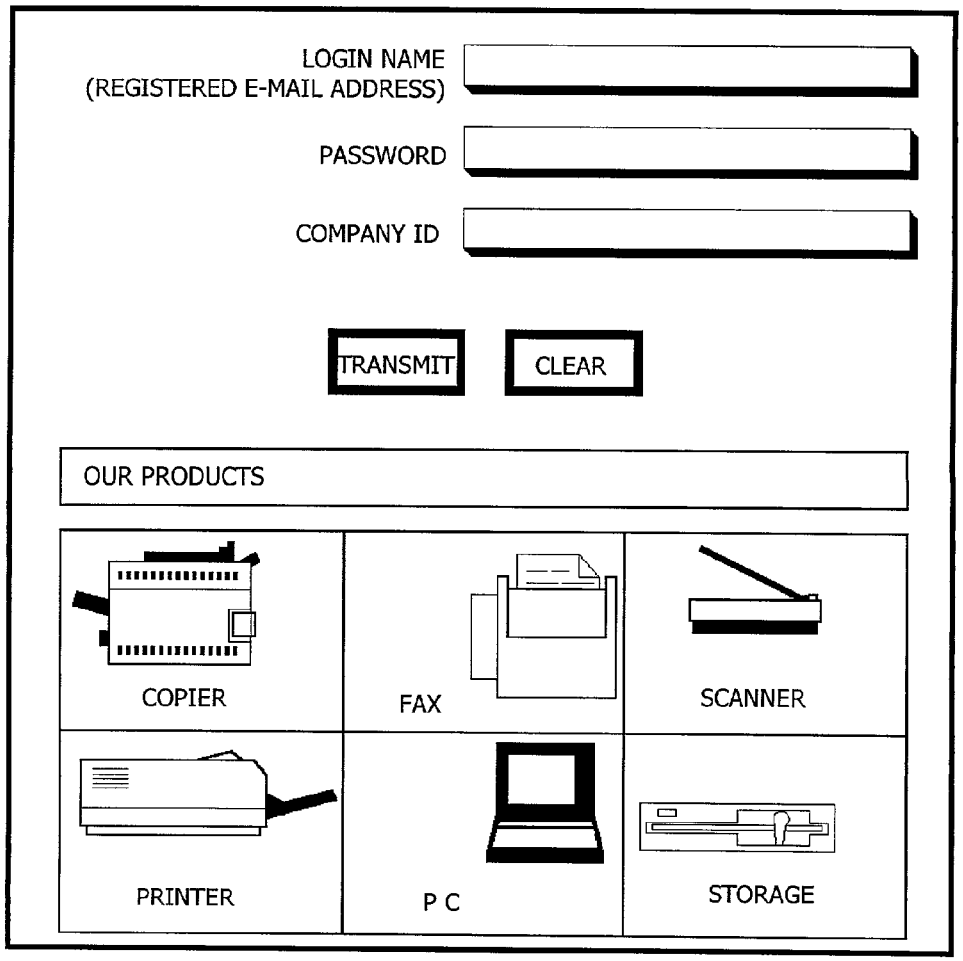
FIG. 9 is a diagram showing an example of a login page transmitted in an information providing process of FIG. 8.

In a case where the customer page is requested (Step S201: Yes), the control unit 20 executes the CGI program and the like to create web page data representing a Login page as illustrated in FIG. 9, and sends the created data to the terminal 500 having sent a request for the access (Step S203).

Upon determination of that there is sent a request for accessing the customer page in step S201, the control unit 20 creates identification information (e.g. cookie) and sends it to the terminal 500 being connected, thereby to recognize the terminal 500 in the following session. Accordingly, the "terminal 500" in the following procedures indicates the terminal 500 having accessed the customer page in step S201.

The user of the copier 300 operates the terminal 500 to input predetermined identification (ID) information including his/her e-mail address, password, company ID, and the like. The input ID information is sent to the center 100 by selecting (clicking) a "Send"button prepared on the Login page.

If the CCU 21 of the center 100 receives the ID information from the terminal 500, the control unit 20 accesses the customer-ID database 22 to determine whether the received ID information has been registered in the customer-ID database 22, thereby to authenticate customers (Step S204).

In the customer authentication procedure of step S204, if the ID information sent from the terminal 500 does not exist in the customer-ID database 22 or if the given ID information does not represent the correct ID, then the user of the terminal 500 is not authenticated as the registered customer, so that any general pages other than the customer page are provided (Step S204: No, Step S202).

If it is determined that the user of the terminal 500 is a registered customer (Step S204: Yes), then a procedure for providing individual information to the customer is carried out.

The control unit 20 accesses the customer-information database 22, based on the ID information sent from the terminal 500 to specify the copier 300 (model ID) used by the customer. Then the control unit 20 collaborates with the information collecting control unit 10 to retrieve the status information of the specified copier 300 from the customer-information database 12 (Steps S205, S206).

The control unit 20 analyzes the status information of the copier 300 obtained in step S206, and selects a suggestion file to be provided to the customer (Step S300).

Specific description will now be made to a process for analyzing the status information and selecting the suggestion matter, as carried out in Step S300.

Followings are some examples of suggestion matters to be selected.

1. Upgrade or Multiplication based on Frequently Used Functions:

a) suggest to upgrade to an advanced model based on copy amount;

b) suggest to multiply a paper tray, if the copy amount exceeds a predetermined threshold;
c) suggestion to multiply the copier to distribute concentrated tasks;
d) suggest to introduce a printing press (printing machine) if the user tends to designate much amount of copies from 1 volume of original;
e) suggest to add a sorter to the copier if the user tends to designate many copies from 1 volume of original;
f) suggest to use a printer if the copy volume is usually small;
g) suggest to add a duplex copy unit originals tend to include plural pages;
h) suggest to initialize duplex copy setting if the copier has already employed the duplex copy unit;
i) suggest to add a stapler if each of the original documents tends to include plural pages while copy amount is usually large;
j) suggest to multiply a printer or copier if interruption for copying often occurs in a case where the copier includes printer function; or
k) suggest to install an additional tray feed if the user frequently changes the size of paper cassette.

2. Tips based on Rarely Used Functions:
a) suggest how to reorder priority of paper tray feeds so as to set the least frequently used tray feed at the bottom;
b) suggest to set lower priority to the least frequently used paper tray feed after comparing the usage frequency in consideration of the directions of the sheets in the tray feed;
c) suggest how to initialize settings, if the most of the settings have been unchanged;
d) suggest how to use the function which has never been used before;
e) suggest how to register facsimile numbers to a phonebook in the copier having facsimile function, if the user often calls the same number; or
f) suggest how to use duplex copy function, combine copy function, or the like if such the function being useful for reducing paper consumption have been unused.

3. Suggestions regarding to Expendable Supply:
a) indicate remaining of expendable supply (such as paper, staples of stapler, etc.), based on the number of consumed papers by paper size or number of times sheets of paper are stapled;
b) indicate remaining of expendable supply in order to optimize inventory for better environmental solution; or
c) suggest environmental solution by showing ways to reduce paper consumption.

Of the above examples, some will now be described in detail with reference to the drawings.

A process for selecting a suggestion file suggesting to upgrade the copier 300 with replacing it with an advanced model based on the copy amount, will now be described with reference to FIG. 10A.

The control unit 20 refers to the status information retrieved in step S206, and obtains information representing the copy amount during a predetermined period (e.g. 1 month) (Step S310).

The control unit 20 accesses the product-information database 26 so as to obtain information representing the performance of all models of the copiers (Step S311).

Figures 10A, 10B:
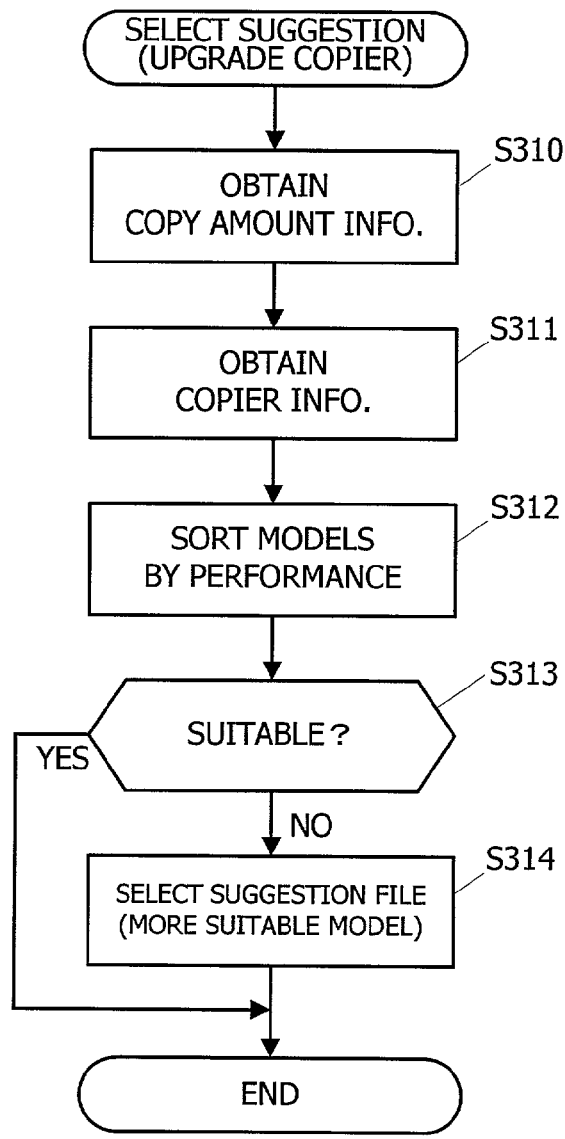
FIG. 10A is a flowchart for explaining an example of a process for analyzing the status information shown in FIG. 8.
FIG. 10B is a diagram showing an example of a table to be referred in a process for analyzing the status information shown in FIG. 10A.

The control unit 20 sorts the information obtained in step S311 by their performances (in this case, for example, copy speed (copy volume/min)), and creates a table as shown in FIG. 10B. In the table, the models are categorized in accordance with the appropriate situations based on copy amount per predetermined period (in this case, 1 month) (Step S312).

The control unit 20 applies the copy amount of the user obtained at step S310 to the table to determine whether the model of the currently-used copier 300 is adequate for its current status (in this case, current copy amount) of the copier 300 (Step S313).

If the copy amount obtained in step S310 is within a range of adequate copy amount for the model of the currently-used copier 300, then it is determined that the model of the currently-used copier 300 is suitable for its status (Step S313: Yes). That is, it is unnecessary for selecting the suggestion file suggesting to upgrade the copier 300 to an advanced model, and hence the process is terminated now.

On the other hand, if the copy amount obtained in step S310 exceeds the adequate range, it is determined that the model of the currently-used copier 300 is not suitable for its current status (Step S313: No). In this case, the control unit 20 selects the advanced model(s) which is suitable (tolerable) for the copy amount obtained in step S301 (Step S314), and the process is completed.

Figure 11A:
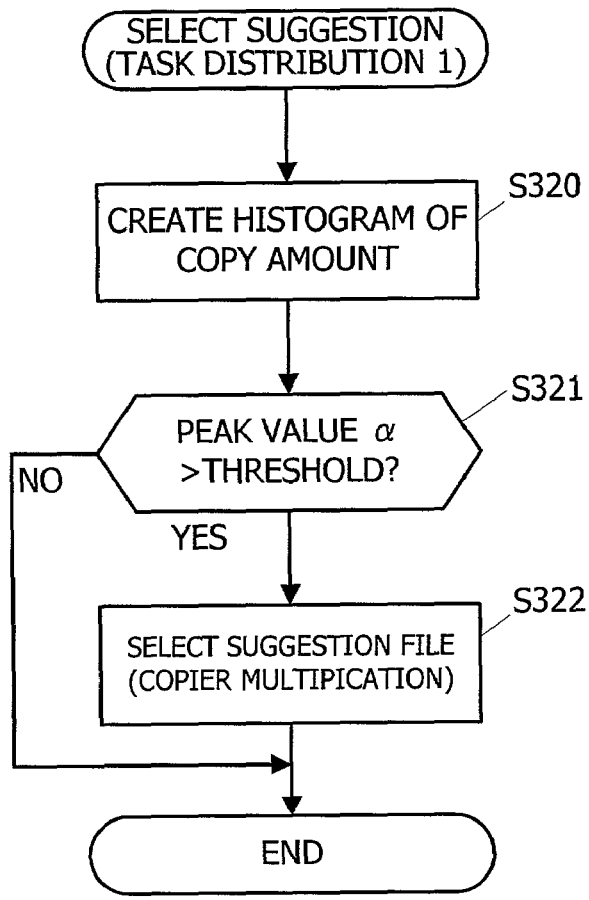
FIG. 11A is a flowchart for explaining another example of a process for analyzing the status information shown in FIG. 8.

Explanation will now be made to another process for suggesting to multiply the copier 300 to reduce task concentration (suggestion for task distribution (1)), with reference to the flowchart shown in FIG. 11A.

Figure 11B:
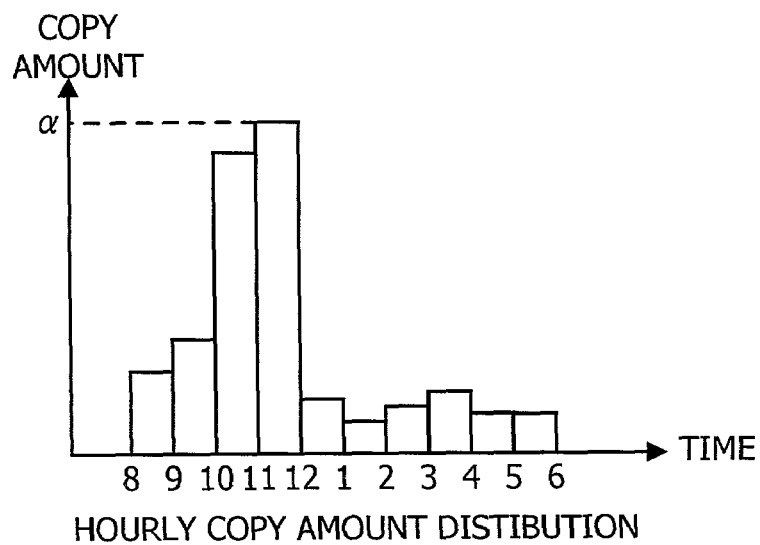
FIG. 11B is a diagram showing an example of a histogram to be referred in a process for analyzing the status information shown in FIG. 11A.

The control unit 20 creates a histogram, as shown in FIG. 11B, showing an example of the copy amount by each time zone, based on the status information obtained in step S206 (Step S320).

The control unit 20 obtains a peak value a of the copy amount from the histogram shown in FIG. 11B. And, the control unit 20 determines whether the obtained peak value á exceeds a threshold value (predetermined reference copy amount for determining whether to suggest the task distribution) (Step S321).

If it is determined that the peak value á does not exceed the threshold value, i.e. there is no need to suggest to task distribution (Step S321: No), then the process is terminated.

On the contrary, if it is determined that the peak value á exceeds the threshold value, i.e. the customer makes a large number of copies intensively and especially during a certain time zone (Step S321: Yes), then the control unit 20 determines to the suggest to multiply the copier 300 for task distribution (Step S322), and the process is completed.

Figure 12A:
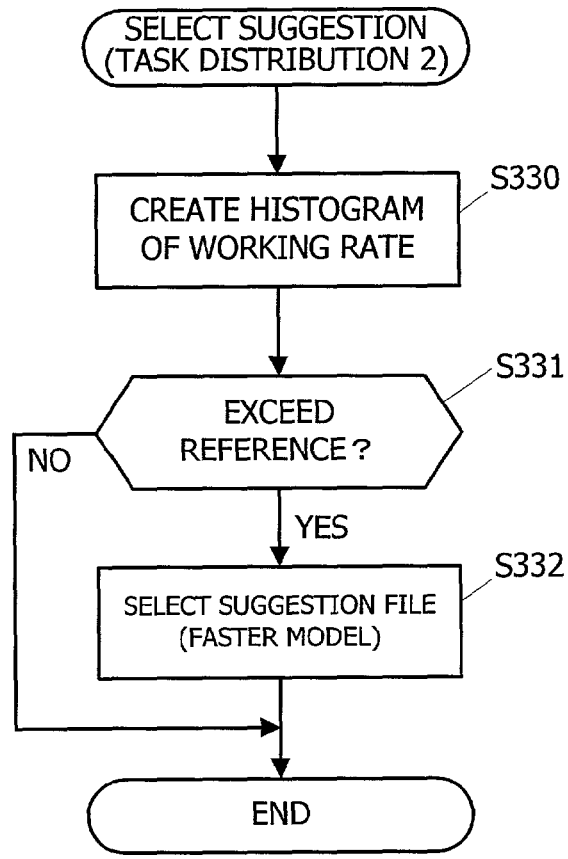
FIG. 12A is a flowchart for explaining still another example of a process for analyzing the status information shown in FIG. 8.

Another example for suggesting task distribution (suggestion for task distribution (2)) will now be described with reference to the flowchart shown in FIG. 12A.

Figure 12B:
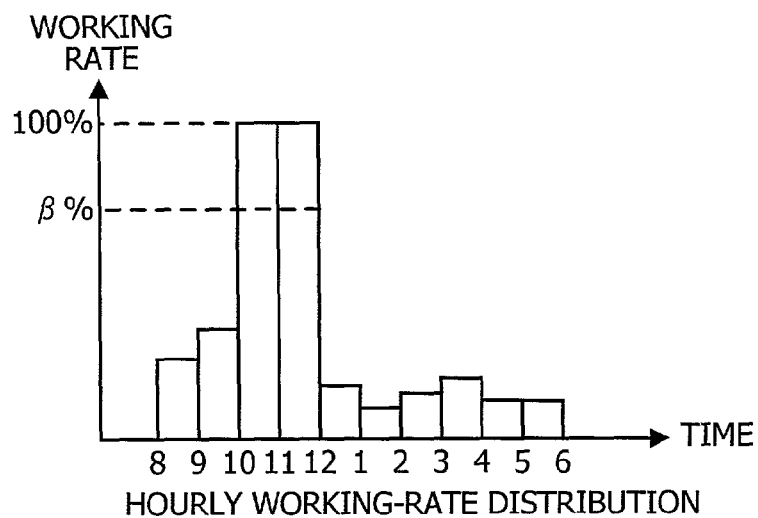
FIG. 12B is a diagram showing an example of a histogram to be referred in the process of FIG. 12A.

The control unit 20 creates a histogram as shown in FIG. 12B showing an example of working rate of the copier 300 by each time zone based on the status information obtained in step S206 (Step S330).

The control unit 20 determines whether there is any time zone corresponding to an working rate which exceeds a threshold percentage â % (predetermined reference rate for determining whether copying tasks should be distributed by multiplying the copier 300, or the copier 300 should be replaced with a faster model), from the histogram shown in FIG. 12B (Step S331).

If there is no such a time zone showing working rate exceeding the threshold rate â % (Step S331: No), then the process is terminated.

On the contrary, if there is a time zone showing working rate exceeding the threshold rate â % (Step S331: Yes), i.e. if the copier 300 is intensively used during a predetermined time zone, then the control unit 20 determines to suggest the customer to multiply the copier 300 for distributing the copying tasks or to upgrade the currently-used copier 300 to a faster advanced model (Step S332), and the process is terminated.

Figure 13:
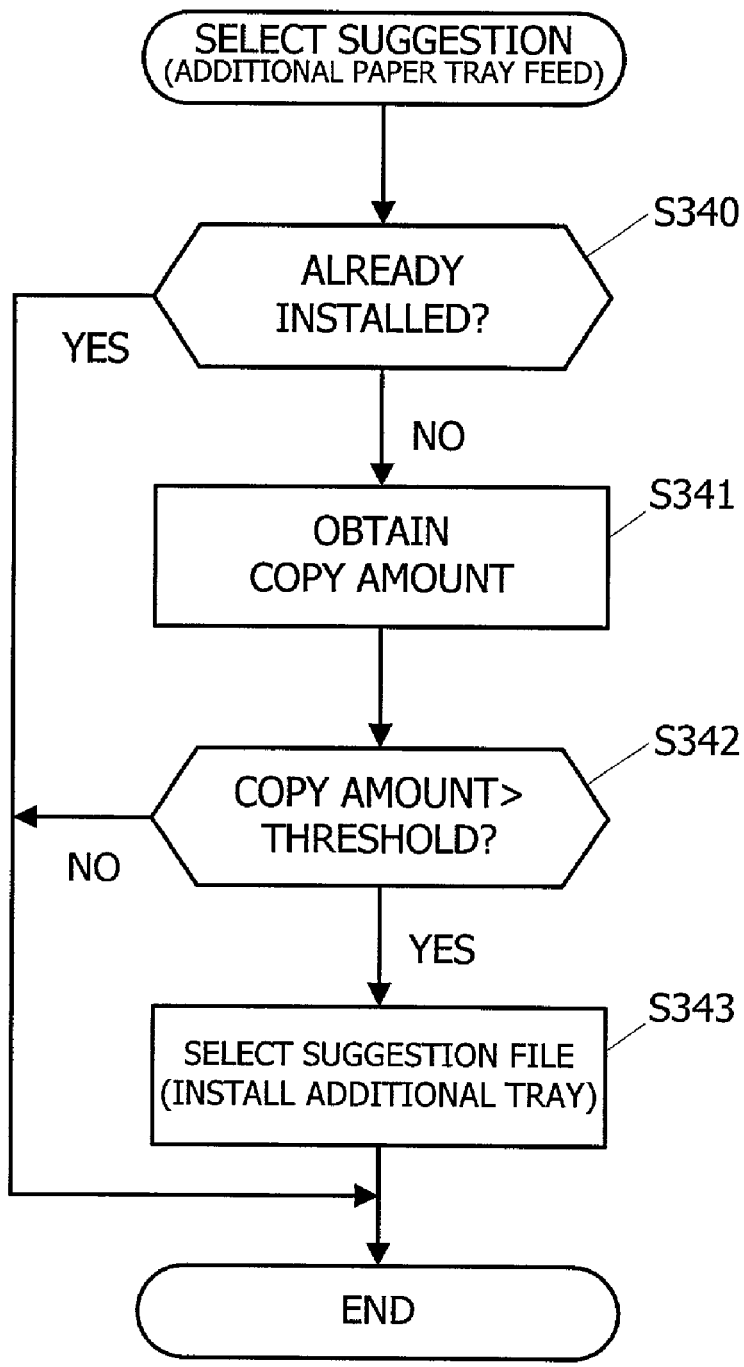
FIG. 13 is a flowchart for explaining still yet another example of a process for analyzing the status information shown in FIG. 8.

Explanation will now be made to a process for suggesting the customer to employ an additional paper tray feed, with reference to the flowchart shown in FIG. 13.

The control unit 20 determines whether an optional paper tray feed has already been installed in the copier 300, based on the status information obtained in step S206 (Step S340).

If the optional paper tray feed has already been installed in the copier 300 (Step S340: Yes), the process is terminated.

On the contrary, if the optional paper tray feed has not yet been installed therein (Step S340: No), then the control unit 20 obtains information representing the copy amount of the copier 300 during a predetermined period (e.g. 1 month), from the status information retrieved in step S206 (step S341).

The control unit 20 determines whether the copy amount shown in the status information retrieved in step S341 exceeds a predetermined threshold value (a predetermined copy amount which is a reference value to determine whether to suggest the customer to install an additional paper tray feed) (Step S342).

If it is determined that the copy amount shown in the status information obtained in step S341 does not exceed the threshold value (Step S342: No), the process is terminated.

On the contrary, if it is determined that the copy amount shown in the status information obtained in step S341 does exceed the threshold value (Step S342: Yes), then the control unit 20 selects the suggestion file indicating that the paper tray feed should be added to the copier 300 (Step S343), and the process is completed.

Figure 14:
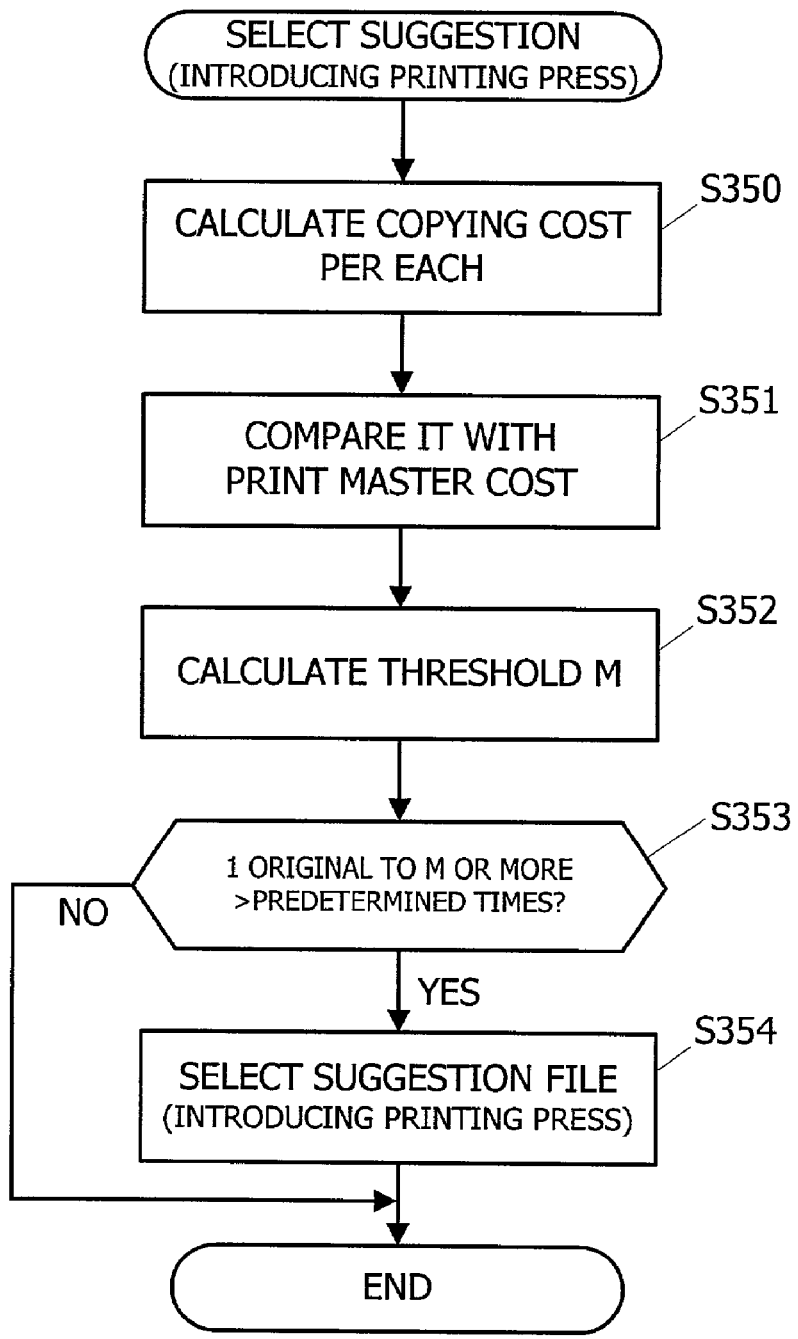
FIG. 14 is a flowchart for explaining further example of a process for analyzing the status information shown in FIG. 8.

Another process for suggesting the customer to add a printing press (printing machine) will now be described with reference to the flowchart shown in FIG. 14.

The control unit 20 accesses the product-information database 26 to obtain the performance information to calculates the copy cost by the copier 300 (Step S350). In this case, the control unit 20 calculates copy cost per page, which includes the cost for sheet, toner, photoconductor, etc.

The control unit 20 calculates a ratio of the copy cost obtained in step S350 to a unit cost for generating print master (printing cost/copy cost) (Step S351), and calculates a threshold value M (the number of consumed papers for copying a single-page-document) based on which the cost of copying is calculated (Step S352).

The control unit 20 obtains the number of times a single-page document (original) is copied to a plurality of sheets during a predetermined period (e.g. 1 month), based on the status information obtained in step S206. The control unit 20 determines whether the number of times the single-page document is copied to the M sheets (pages) or more, calculated in step S352, exceeds a predetermined number (Step S353).

If it is determined that the number of times the single-page document is copied to the M sheets (pages) or more does not exceed the predetermined number (Step S353: No), then the process is terminated.

On the contrary, if it is determined that the number of times the single-page document is copied to the M sheets (pages) or more does exceed the predetermined number (Step S353: Yes), then the control unit 20 determines that it is cheaper to print the document using a printing press (printing machine) rather than copying the document using the copier 300. The control unit 20 determines to select the suggestion file indicating that introducing the printing press (printing machine) is helpful for cost reduction (Step S354), and the process is completed.

The processes raised above are just examples. Any other various processes for selecting the suggestion file may be carried out. Those processes may be carried out simultaneously in step S300, or those may be carried out sequentially one after another.

Upon completion of the process for analyzing the status information of the copier 300 in step S300, the control unit 20 retrieves the suggestion file corresponding to the suggestion to be made, from the suggestion-information database 24 (Step S208).

Figure 15:
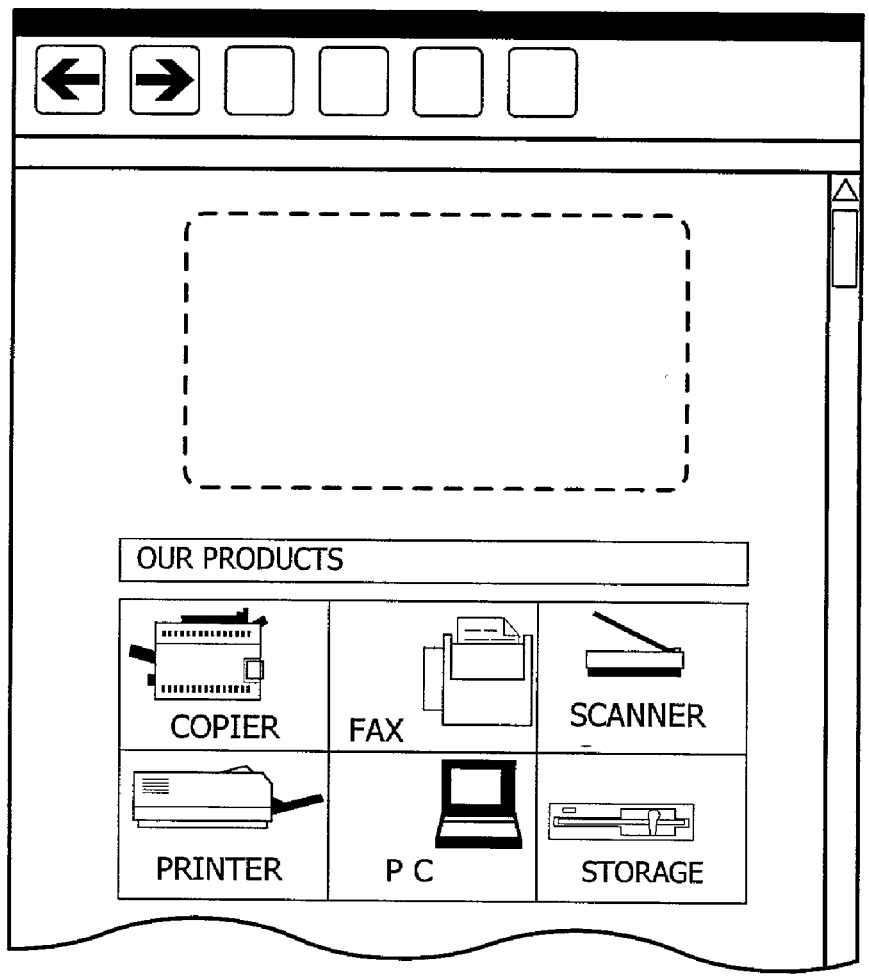
FIG. 15 is a diagram for explaining a personalized information area prepared in a Web page to be transmitted in a process for analyzing the status information shown in FIG. 8.

The control unit 20 executes the CGI program, etc., and creates web page data including the suggestion information retrieved in step S208 (Step S209). Note that, an area for displaying personalized information including the suggestion information retrieved in step S208 is prepared in the customer page at a position above another information (general information), as indicated by a broken line shown in FIG. 15. Hereinafter, such the area will be referred to as "personalized information area". The control unit 20 creates web page data in such a manner that the suggestion information retrieved in step S208 is displayed in this personalized information area. Specifically, as shown in FIGS. 16 and 17, user name based on the ID information received in step S204 is displayed in the personalized information area together with the suggestion information retrieved in step S208.

Figure 16:
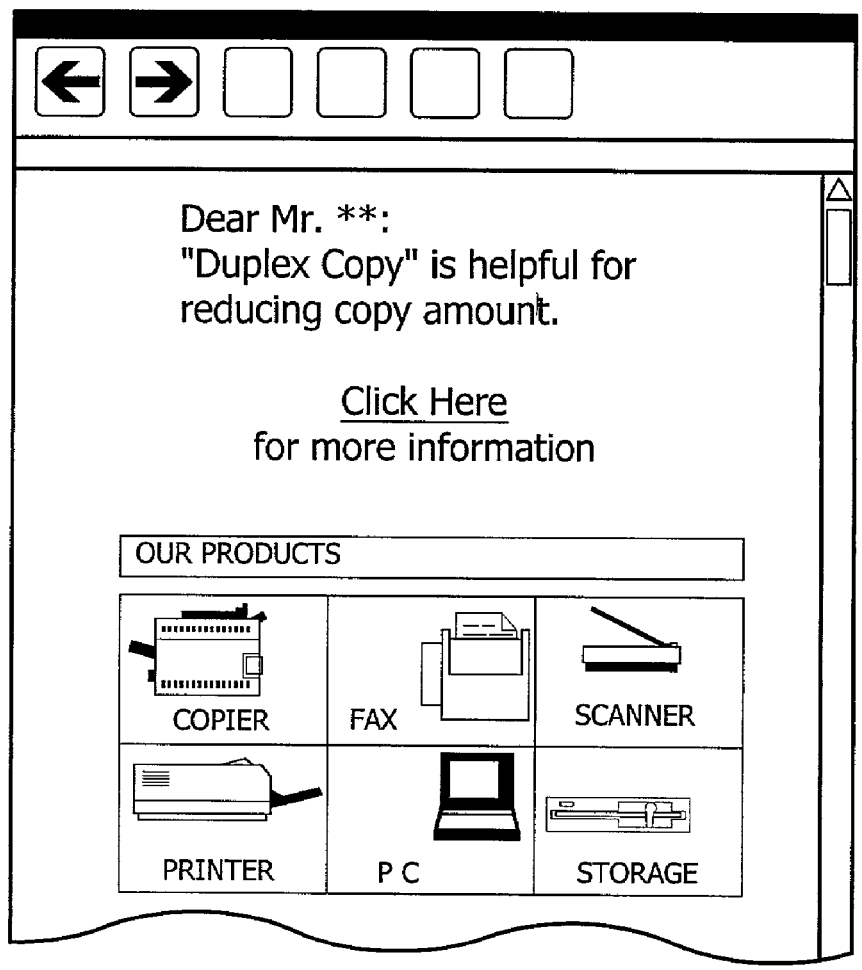
FIG. 16 is a diagram showing an example of a Web page to be transmitted in a process for analyzing the status information shown in FIG. 8.

FIG. 16 is a diagram showing an example of a suggestion message indicating useful tips (of function) being displayed through the Web page. As shown, the suggestion message (text) retrieved from the suggestion-information database 24 is displayed in the personalized information area. In the suggestion message, "Click Here" is linked to the corresponding suggestion-information file indicating the tips (how to use the function).

Figure 17:
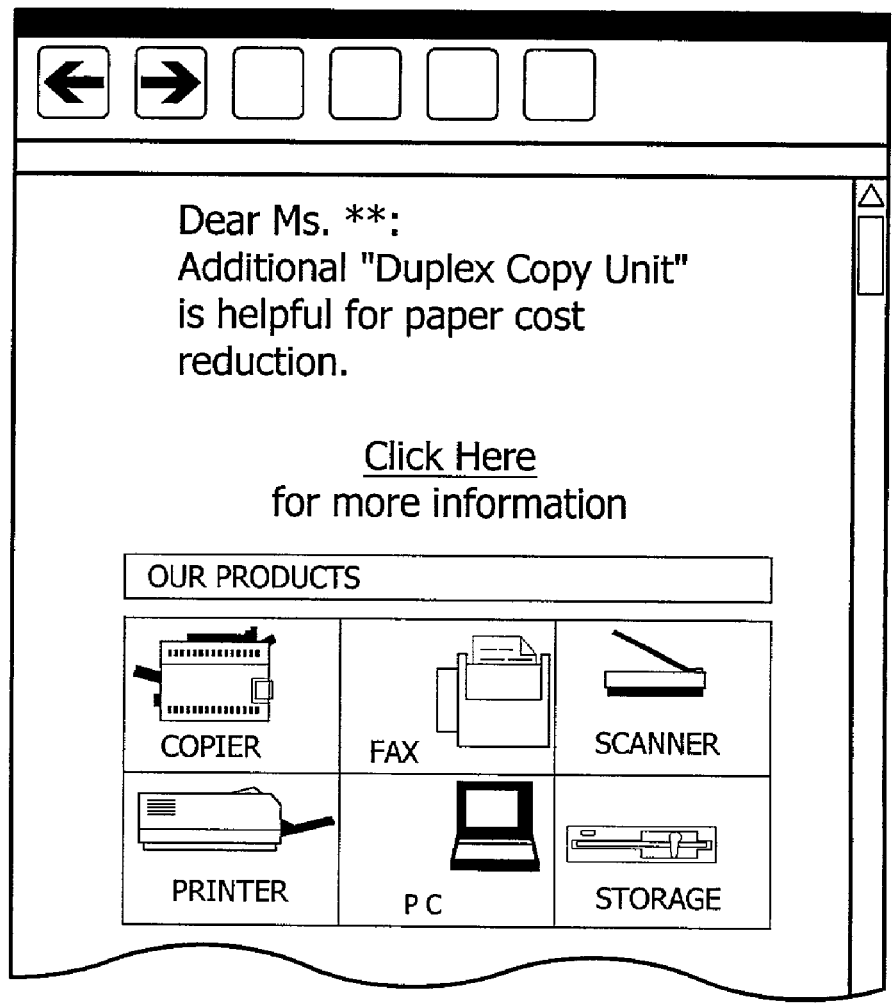
FIG. 17 is a diagram showing another example of a Web page to be transmitted in a process for analyzing the status information shown in FIG. 8.

FIG. 17 is a diagram showing an example of a suggestion message suggesting to install an optional device (parts, peripherals, etc., hereinafter referred to as "optional device") being displayed through the Web page. The suggestion message retrieved from the suggestion-information database 24 is displayed in the personalized information area. In the suggestion message "Click Here" is linked to file representing the performance information (including technical information, spec., and the like) of the corresponding optional device.

The control unit 20 controls the CCU 21 to send the created web page data to the terminal 500 (Step S210), and the information providing process is completed.

In the above-described process for analyzing the status of the copier 300 (Step S300), the suggestion matter may be selected under the consideration of the section to which the user having accessed the customer page belongs. In this case, the control unit 20 accesses the customer-ID database 22 to specify the section based on the ID information received in step S204. If the specified section often uses the copier 300, then the control unit 20 is likely to select the suggestion file indicating the tips. On the other hand, the specified section is related to management affairs, the control unit is likely to select the suggestion file suggesting introduction of new models.

If an optional device or new model is suggested, then the displayed page may be linked to an order form page for purchasing that optional device or new model.

In the above embodiment, the explanations have been made to the case of the copier 300. However, the present invention may be applicable to another image data processor (image forming apparatus, imaging machine) such as a printer, facsimile machine, and the like.

As explained above, in the information collecting/providing system 1000 according to the first embodiment of the present invention, if the customer of the copier 300 accesses the customer page, the latest status information of the copier 300 being used by the customer is automatically retrieved and analyzed. Then, any suggestion corresponding to the analyzed result is made and informed through the Web page. Thus, the manufacturer/vendor of the copier 300 can easily and effectively suggest the customer of the copier 300 to introduce another function (device, parts, peripherals, etc.) or to replace the currently-used copier with a new machine. In addition, the user of the copier 300 can easily and effectively get the helpful and useful suggestion information.

Second Embodiment

In the above first embodiment, unless the user accesses the Web site, he/she can not obtain the suggestion information. If the control unit 20 of the center 100 has an e-mail server function, the company (manufacturer and/or vendor) of the copier 300 can actively send suggestion information to the user. In this case, the user can be informed about the timing for replenishing/replacing any expendable supply (e.g. toner, paper, etc.) in the copier 300, based on the collected status information. Such the structure of an information collecting/providing system will now be described in the second embodiment.

The structure of the information collecting/providing system of this embodiment has substantially the same as that of the information collecting/providing system 1000 of the first embodiment. Thus, this embodiment also employs the information collecting/providing system 1000, and the description of it is omitted.

Process by the information collecting/providing system 1000 according to this embodiment will now be explained with reference to the flowchart shown in FIG. 18.

In each of the copiers 300, the various sensors 31 detect the number of consumed papers and the consumption of toner at each operation in the copier 300 (Step S401).

The control unit 30 of the copier 300 sends information representing the number of consumed papers and the consumption of toner which are obtained in step S401 (hereinafter referred to as "expendable supply information"), to the transmission device 400. The recipient 41 of the transmission device 400 receives the expendable supply information. The control unit 40 controls the storage unit 42 to store the expendable supply information received from the copier 300 and the status information as shown in FIG. 3. The control unit 40 controls the transmitter 43 to send the expendable supply information and status information stored in the storage unit 42, to the center 100 through the PSTN 2 at predetermined intervals (Step S402).

In the center 100, the CCU 11 of the information collector 110 receives the expendable supply information and status information from the transmission device 400. The controller 10 controls the customer-information database 12 to store the received information (Step S403). At this time, controller 10 controls the customer-information database 12 so that the information is classified customer by customer.

The control unit 10 calculates the duration for each of expendable, based on the expendable supply information stored in the customer-information database 12 (Step S404). The control unit 10 analyzes the status information regarding the copier 300 for a predetermined period (1 month, for example), thereby calculating the usage frequency (how often the customer uses the copier 300) copier by copier (that is, customer by customer). The control unit 10 refers to information representing the usage amount of each expendable supply. The control unit 10 calculates how many days each of the expendable supply lasts from the present time on, if the copier 300 is actually used at the calculated usage frequency.

The control unit 10 determines whether the duration (days) calculated in step S404 is equal to or less than a predetermined reference period (e.g. 1 week, 1 month, etc.) (Step S405).

If it is determined that the obtained duration is equal to or less than the predetermined reference period (Step S405: Yes), then the control unit 10 accesses the customer-information database 12 to refers to flag (not shown) being is affixed to the expendable supply information stored in the customer-information database 12 (hereinafter referred to as "consumption flag"). If the consumption flag indicates "0", it means that the obtained duration is not equal to or less than the predetermined reference period, whereas if the consumption flag indicates "1", it means that the obtained duration is equal to or less than the predetermined reference period. This consumption flag is reset to "0", every time each corresponding one of the expendable supply is replaced with a new one.

The control unit 10 determines whether the referred consumption flag indicates "0"(Step S406).

If it is determined that the consumption flag indicates "0" in step S406, i.e. if the obtained duration is not equal to or less than the predetermined reference period (Step S406: Yes), then the control unit 10 sets the consumption flag to "1" (Step S407).

On the contrary, if it is determined that the consumption flag indicates "1", then it means that the obtained duration which is equal to or less than the predetermined reference period has already been registered, and that a later-described information providing process had already been done, and the control unit 10 terminates the process (Step S406: No).

If the consumption flag is set to "1" in step S407, then the control unit 10 informs the control unit 20 of the information provider 120 that there is detected one expendable supply which lasts for the duration equal to or less than the predetermined reference period, and carries out the later-described information providing process (Step S410).

If it is determined that the obtained duration is not equal to or less than the predetermined reference period in step S406, then the control unit 10 accesses the customer-information database 12 to determine whether the consumption flag corresponding to the information of the corresponding expendable supply is "1" (Step S408).

If it is determined that this consumption flag is "1" (Step S408: Yes), it means that the expendable supply which was determined to last for the duration equal to or less than the predetermined reference period, has already been replenished or replaced. Hence, the control unit 10 resets the consumption flag to "0" (Step S409), and terminates the process.

On the contrary, if it is determined that the consumption flag does not indicate "1" (Step S408: No), then there is no need to perform the later-described information providing process for informing the customer that the currently-used expendable supply should be replenished or replaced with new one, and hence the process is terminated.

The information providing process (step S410 or S510) as carried out by the information provider 120 will now be explained with reference to FIGS. 19 to 24.

Figure 19:
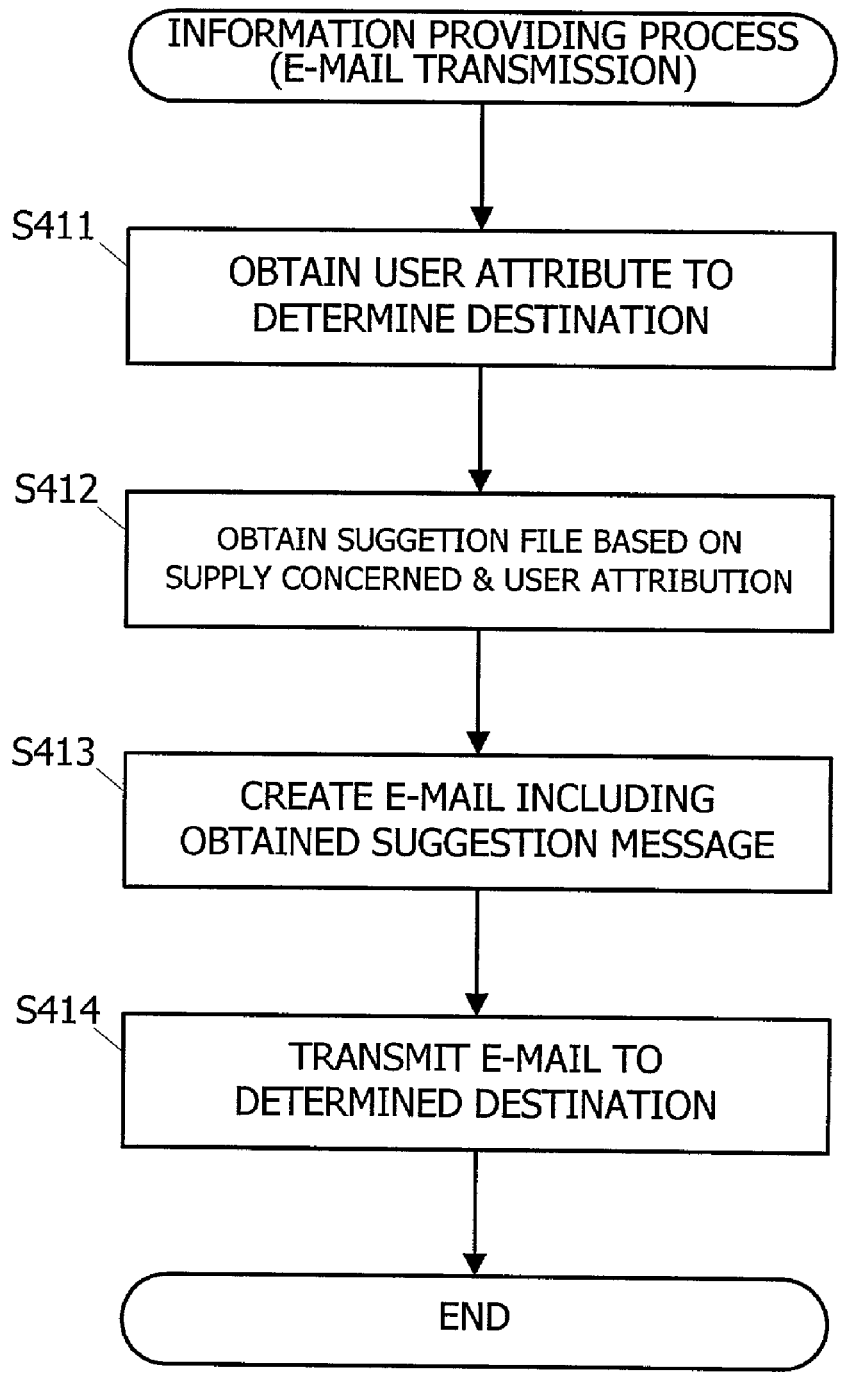
FIG. 19 is a flowchart for explaining a process for providing information by e-mail according to a second embodiment of the present invention.

The information providing process for providing information (step S410) by an e-mail will now be described with reference to FIGS. 19 to 21.

The control unit 20 accesses the customer-ID database 22 to retrieve user information of the copier 300 including the expendable supply determined to last for the during which is equal to less than the predetermined reference period in step S405. The control unit 20 determines destination of an e-mail based on the user attribute information corresponding to the retrieved user information (Step S411).

According to the user attribute information, the users are categorized, for example, into "ordinary user" who merely operates the copier 300, "key operator" who can handle maintenance tasks (e.g. refilling the toner, etc.) of the copier 300, "purchaser" who is in charge of purchasing the goods relating to the copier 300 (e.g., toner, paper, etc.), and "business manager" who is in charge of managing the business of the company.

Under this situation, since the control unit 20 is going to send e-mails to inform the users that life of the expendable supply will end soon, the control unit 20 selects the users belonging to the "key operator" who performs replenishment task, and to "purchaser" who purchases the expendable supply. The control unit 20 obtains e-mail addresses of them from the customer-ID database 22 at step S411.

Then, the control unit 20 retrieves adequate suggestion message in a fixed form from the suggestion-information database 24, based on the user-attribute information retrieved in step S411 and the expendable supply information indicating the expendable supply determined to last for the duration equal to or less than the predetermined reference period in step S405 (Step S412). Specifically, if the expendable supply concerned is a toner unit, then there are retrieved suggestion file representing a suggestion message for suggesting the key operator to replace the currently-used toner unit with a new one, and another suggestion file representing a suggestion message for suggesting the purchaser to purchase a new toner unit.

The control unit 20 executes a predetermined program to create e-mails including the suggestion messages shown in the suggestion files retrieved in step S412 (Step S413). Particularly, the control unit 20 creates e-mails addressed to the key operator (FIG. 20) and addressed to the purchaser (FIG. 21).

The control unit 20 controls the CCU 21 to transmit the e-mails created in step S413 to the e-mail addresses obtained in step S411 (Step S414).

Figure 22:
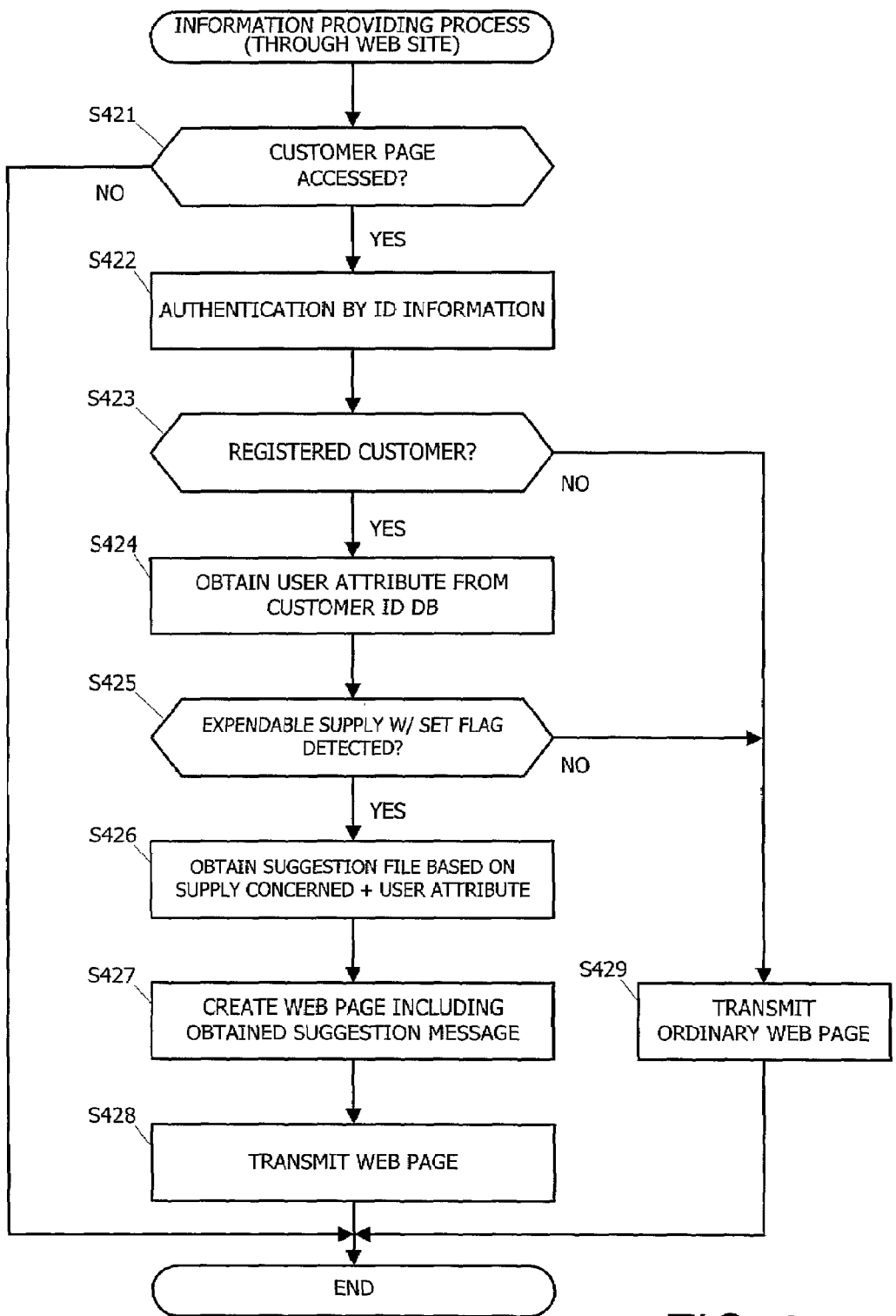
FIG. 22 is a flowchart for explaining a process for providing information through a Web page according to a second embodiment of the present invention.
Figure 23:
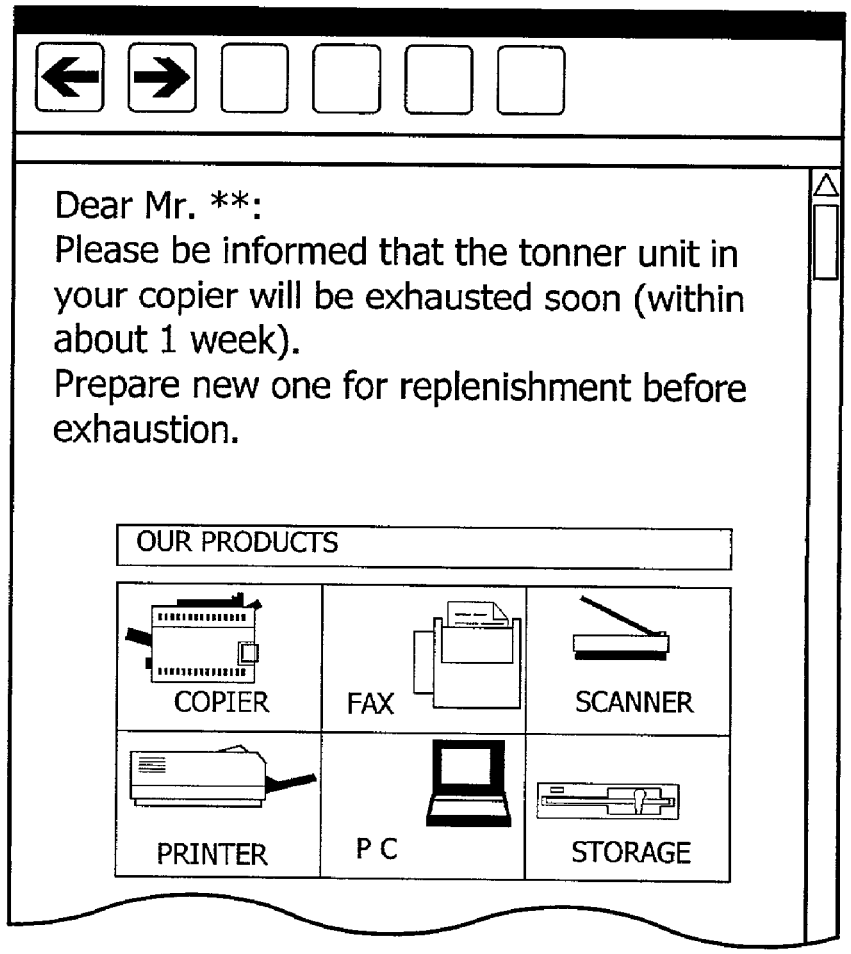
FIG. 23 is a diagram showing an example of a Web page to be provided in an information providing process shown in FIG. 22.
Figure 24:
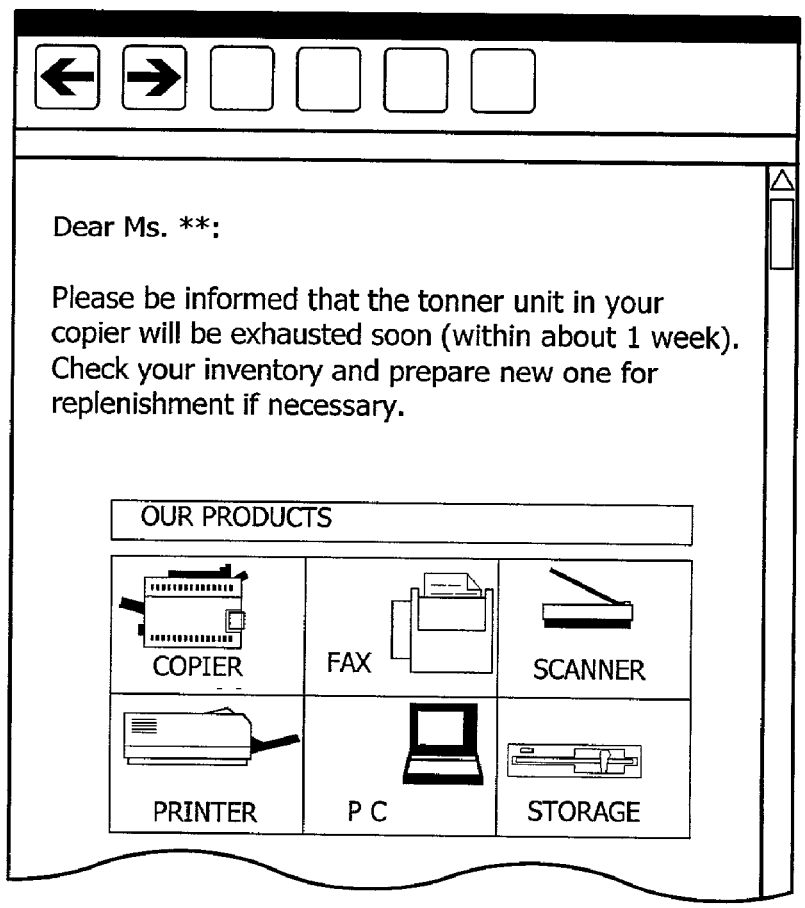
FIG. 24 is a diagram showing another example of a Web page to be provided in an information providing process shown in FIG. 22.

A process for providing information through the Web page will now be described with reference to FIGS. 22 to 24.

In this embodiment, likewise the first embodiment, the Web site is established by the information provider 120, and includes the customer page.

If a customer accesses the customer page (Step S421: Yes), then the control unit 20 executes the CGI program and the like to create web page data representing the Login page as shown in FIG. 9. The control unit 20 controls the CCU 21 to send the created data to the terminal 500 having accessed the customer page.

The user of the copier 300 operates the terminal 500, inputs predetermined ID information including his/her e-mail address, password, company ID, and the like through the Login page. The input ID information is sent to the center 100 by selecting (clicking) "Send" button prepared in the Login page.

In the center 100, when the CCU 21 of the information provider 120 receives the ID information from the terminal 500, the control unit 20 authenticates the user of the terminal 500, based on the received ID information (Step S422).

The control unit 20 determines whether the user of the terminal 500 is a registered customer, by comparing the ID information sent from the terminal 500 with the customer ID information stored in the customer-ID database 22.

In the customer authentication procedure of step S122, if the ID information sent from the terminal 500 does not exist in the customer-ID database 22, or if an adequate set of ID information is not included in the input information, then the user of the terminal 500 is not authenticated as a registered customer, thereby being provided with a general page other than the customer page (Step S423: No, Step S429).

On the contrary, if it is determined that the user of the terminal 500 is a registered customer (Step S423: Yes), then the control unit 20 accesses the customer-ID database 22, and retrieves user attribute information of him/her (Step S424).

Then, the control unit 20 access the customer-information database 12 through the control unit 10 to refer to the status information corresponding to the customer concerned. The control unit 20 determines whether there are consumption flags indicating "1" (Step S425).

If there are consumption flags representing "1", i.e. life of the corresponding expendable supply will end within equal to or less than a predetermined reference period (Step S425: Yes). In this case, the control unit 20 retrieves an adequate suggestion file from the suggestion-information database 24, based on the corresponding expendable supply and the user attribute information retrieved in step S424 (Step S426).

Subsequently, the control unit 20 executes the CGI program and the like to create web page data including the suggestion message shown in the suggestion file retrieved in step S426 (Step S427). If the expendable supply concerned is the toner unit and the user concerned belongs to the key operator, then the control unit 20 creates a Web page as shown in FIG. 23 which includes the suggestion message informing the user that the currently-used toner unit will be exhausted soon. On the contrary, if the user concerned belongs to the purchaser, the control unit 20 creates a Web page as shown in FIG. 24 which includes the suggestion message for suggesting the user to purchase a new toner unit.

The control unit 20 controls the CCU 21 to send the web page data created in step S427 to the terminal 500 (Step S428), and terminates the process.

According to the second embodiment, the center 100 periodically and automatically collects information representing the consumption of the expendable supply of the copier 300, and calculates the duration for which each of the expendable supply lasts from the present time on, based on the usage frequency of the copier 300 customer by customer. If the calculated duration is equal to or less than the predetermined reference period, then the center 100 informs the corresponding customer (user) about the duration by e-mail. In this structure, each customer can be aware of adequate timings for replenishing or replacing the currently-used expendable supply used in the copier 300, even if the user is away from the copier 300.

Further, the duration for which corresponding expendable supply lasts is calculated in accordance with the usage frequency of each copier 300 (by each customer). Hence, unlike the case where the customer is informed about the timing for replenishing or replacing the corresponding expendable supply based on the consumption (or the remaining) of the expendable supply, the customer is informed of the adequate timing for replenishing or replacing the expendable supply.

Not only informing the customer of the above exemplified messages by e-mail, the customer is able to be informed of them through the Web page. Therefore, the customer can certainly be aware of the timing for replenishing/replacing the expendable supply.

Third Embodiment

In the above second embodiment, the customer of the copier 300 is merely informed about the timing for replenishing/replacing the expendable supply of the copier 300. The system may present opportunity to purchase the expendable supply together with presenting information about the replenishment/replacement timing.

Explanation will now be made of an information collecting/providing system, wherein a customer may purchase expendable supplies when it is time to replenish/replace the currently-used expendable supplies, according to a third embodiment of the present invention.

Figure 25:
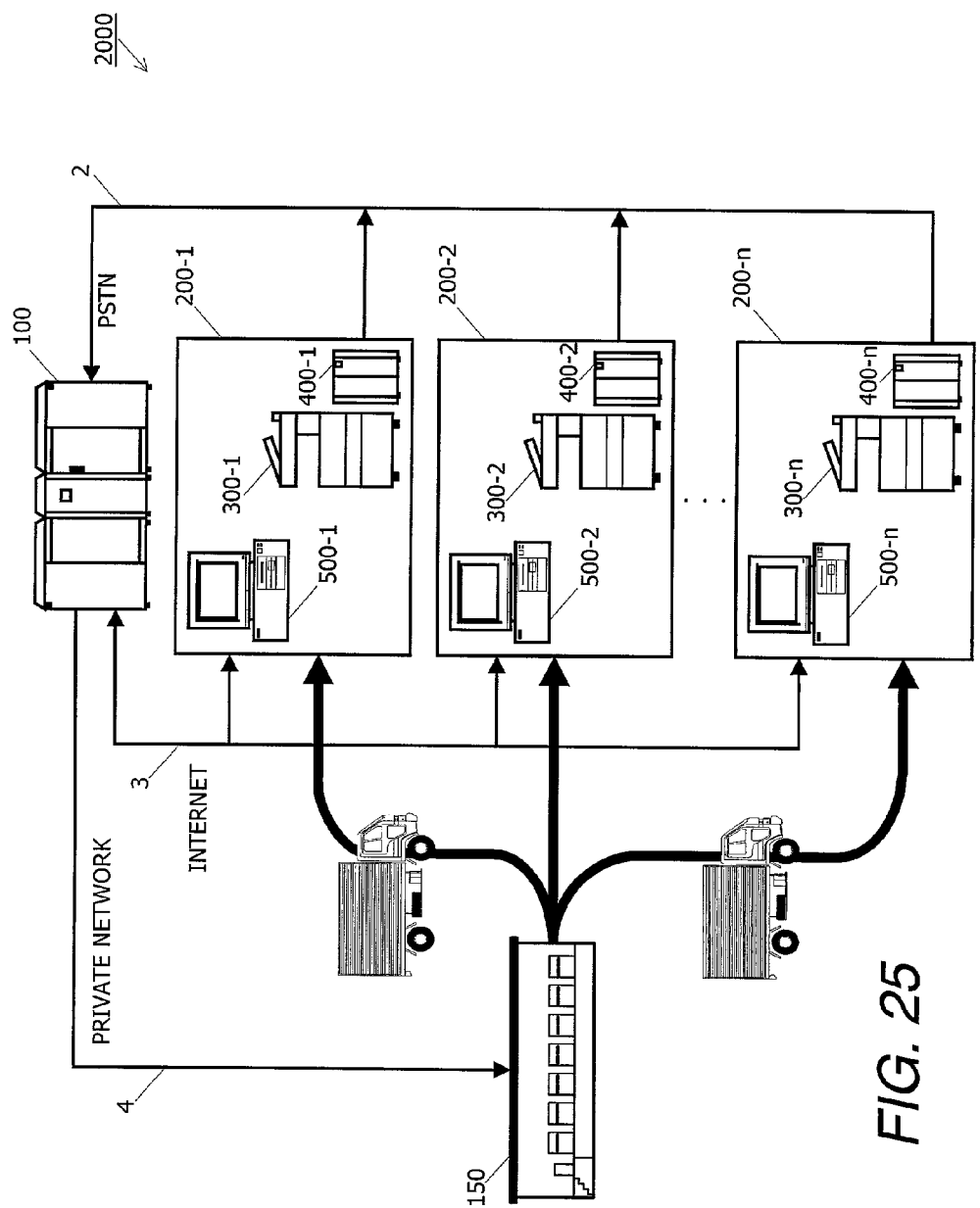
FIG. 25 is a diagram showing an example of a structure of an information collecting/providing system according to a third embodiment of the present invention.

FIG. 25 schematically shows an example of a structure of an information collecting/providing system 2000 according to this embodiment.

As shown in FIG. 25, the structure of the information collecting/providing system 2000 of this embodiment may be substantially the same as that of the information collecting/providing system 1000 according to the first and second embodiments. However, the information collecting/providing system 2000 of this embodiment further includes a delivery center 150 which is connected with the center 100 via a private network 4.

The delivery center 150 is a facility for supplying the company 200 with goods, including expendable supplies such as a toner unit to be installed in the copier 300. The delivery center 150 is also managed by the organization which manages the center 100. The private network 4 which interconnects the center 100 and the delivery center 150 may be WAN, intranet, or the like which may be realized by an arbitrary network medium such as a leased line, a PSTN, or an IP network. In this embodiment, the private network 4 employs a leased line.

Figure 26:
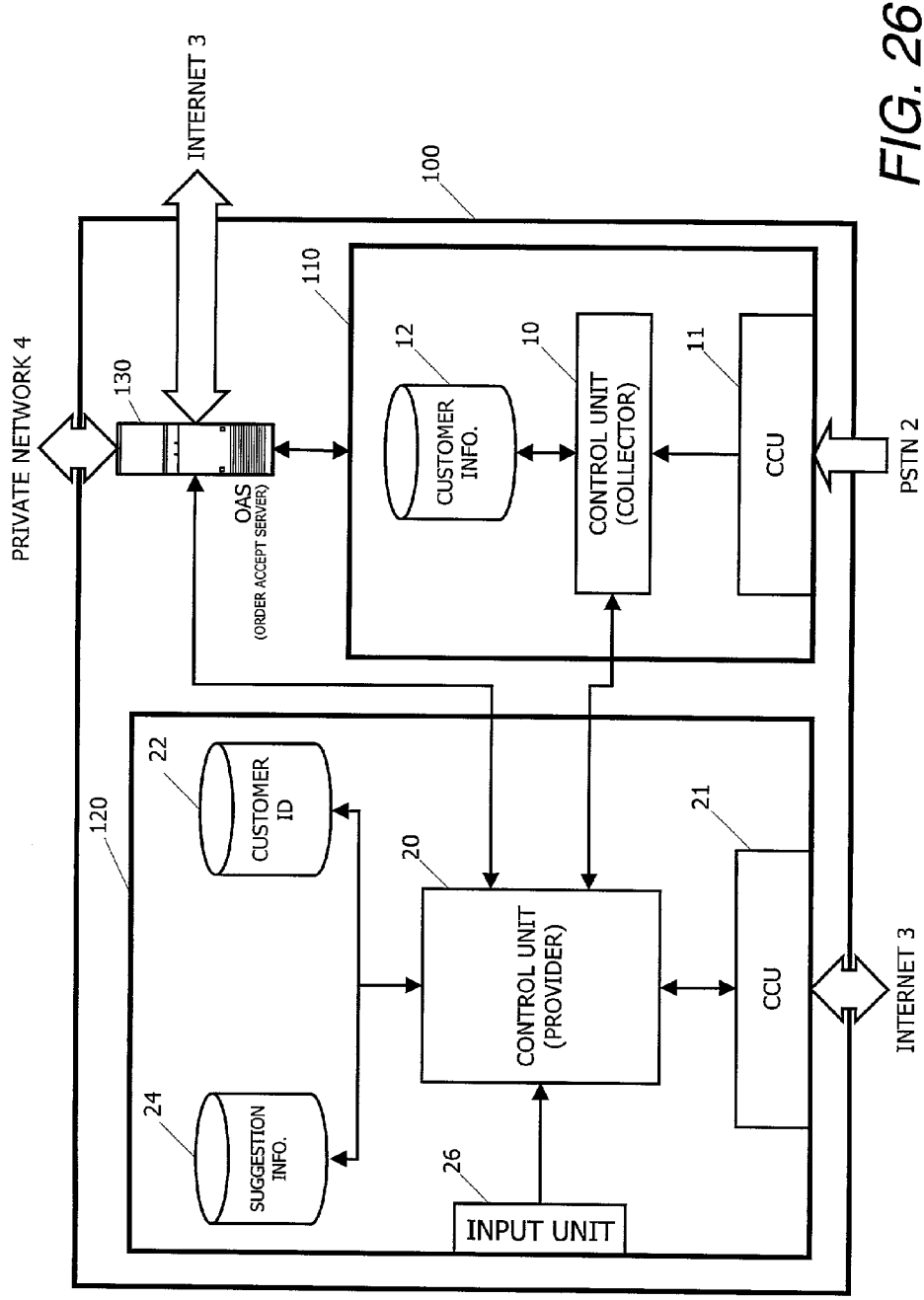
FIG. 26 is a block diagram schematically showing an example of a structure of a center shown in FIG. 25.

The structure of the center 100 according to this embodiment will now be described with reference to FIG. 26. The structure of the center 100 according to this embodiment is substantially the same as that of the center 100 according to the first and second embodiments. However, as shown in FIG. 26, the center 100 of this embodiment includes an order accept server 130 (hereinafter referred to as "OAS 130"), unlike the structure of the center 100 according to the first and second embodiments. In FIG. 26, the same components are identified by the same reference numerals as those components of the center 100 of the first embodiment which is illustrated in FIG. 2, and are not explained in this embodiment.

The OAS 130 maybe a Web server realized by a computer such as a workstation, etc., and is connected to the Internet 3. The OAS 130 executes the CGI program and the like to provide order form pages for ordering the expendable supply through the Internet 3. The OAS 130 is also connected to the private network 4, and sends order information to the delivery center 150.

The structures of the copier 300 and transmission device 400 included in the information collecting/providing system 2000 of this embodiment are the same as those of the copier 300 and transmission device 400 shown in FIG. 6 according to the first and second embodiments. Hence, no additional description will be made to the structures of the copier 300 and transmission device 400 of this embodiment.

Figure 18:
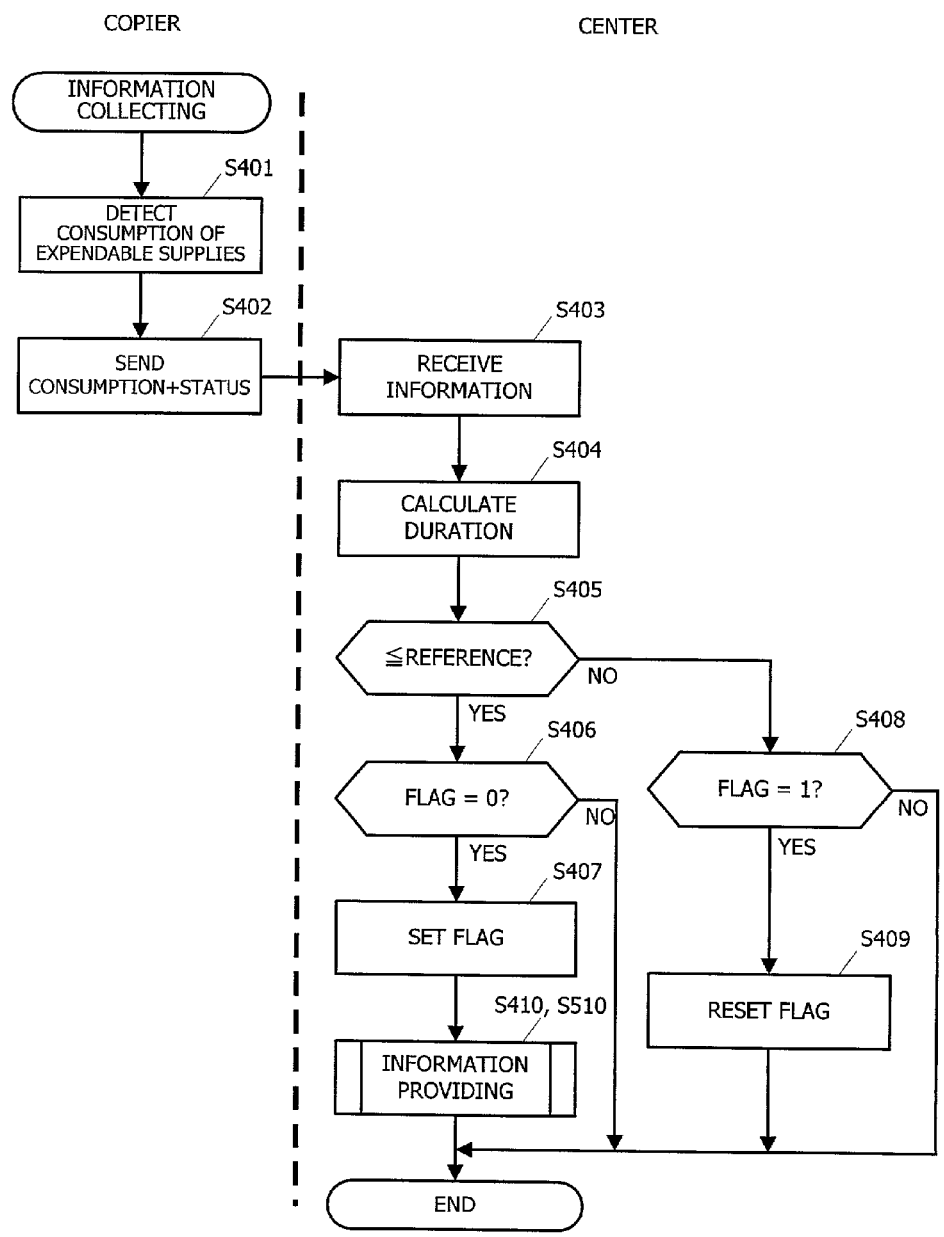
FIG. 18 is a flowchart for explaining an information collecting process which is carried out by an information collecting/providing system according to a second embodiment of the present invention.

Since the information collecting process carried out by the information collecting/providing system 2000 according to this embodiment is substantially the same as the information collecting process according to the second embodiment shown in FIG. 18, additional explanation of the process according to this embodiment is omitted.

Figure 27:
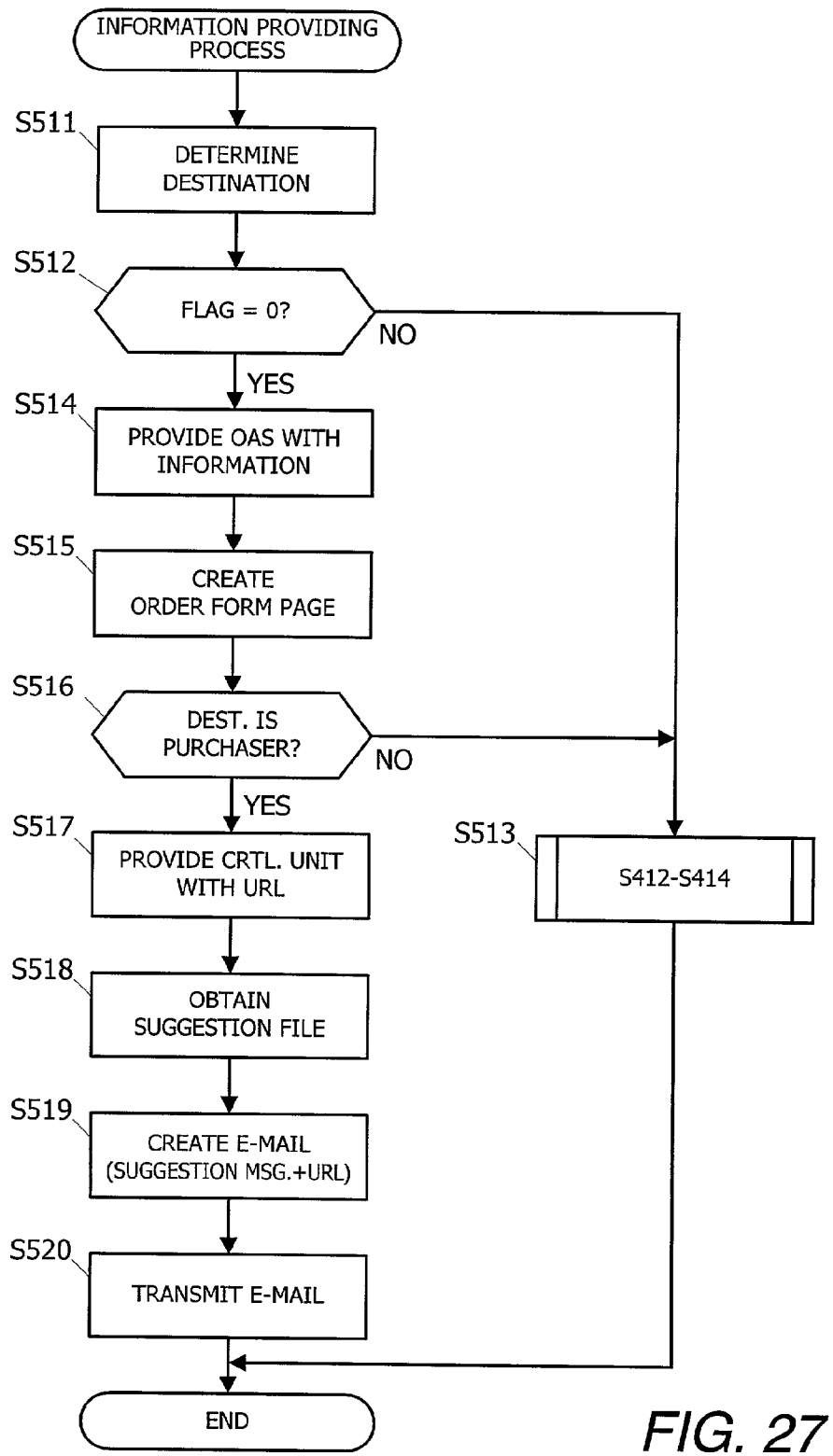
FIG. 27 is a flowchart for explaining an information providing process carried out by a system shown in FIG. 25.

An information providing process (Step S510) which is carried out by the information collecting/providing system 2000 according to this embodiment will now be described with reference to the flowchart shown in FIG. 27.

This information providing process starts if it is determined that the duration for which corresponding expendable supply last is equal to or less than a predetermined reference period, in the information collecting process shown in FIG. 18.

The control unit 20 accesses the customer-ID database 22 to obtain user information corresponding to the copier 300, including the expendable supply determined to last for the duration equal to or less than the predetermined reference period in step S405. The control unit 20 specifies a receiver of an e-mail for providing information based on the user attribute information corresponding to the obtained user information (Step S511). At this time, the control unit 20 sends an e-mail informing the recipient that the available duration of the corresponding expendable supply is drawing to an end. Hence, the control unit 20 retrieves e-mail address information corresponding to the purchaser and key operator.

The control unit 20 accesses the customer-information database 12 through the control unit 10 to refer to the purchase flag affixed to the information representing the expendable supply. This purchase flag is to indicate whether the expendable, determined to last for the duration equal to or less than the predetermined reference period in step S405, has already been purchased. If this purchase flag indicates "0", it implies that the corresponding expendable supply has not yet been purchased. The control unit 20 determines whether the purchase flag indicates "0" (Step S512).

If the purchase flag indicates "1", i.e. the expendable supply has already been purchased (Step S512: No), then it is unnecessary for providing an order form Web page (described later) for ordering expendable supply, and for suggesting the recipient (purchaser) of the e-mail to purchase the expendable supply. Thus, the above procedures through steps S412 to S414 according to the second embodiment of the present invention are executed with targeting only the key operator (receiver of the e-mail) determined in step S511. That is, the control unit 20 sends the e-mail as shown in FIG. 20 suggesting the key operator to replace the corresponding expendable supply (Step S513), and terminates the process.

On the contrary, if the purchase flag indicates "0", that is, if the corresponding expendable supply has not yet been purchased (Step S512: Yes), then the control unit 20 supplies the OAS 130 with the information representing the corresponding expendable supply (Step S514).

Figure 28:
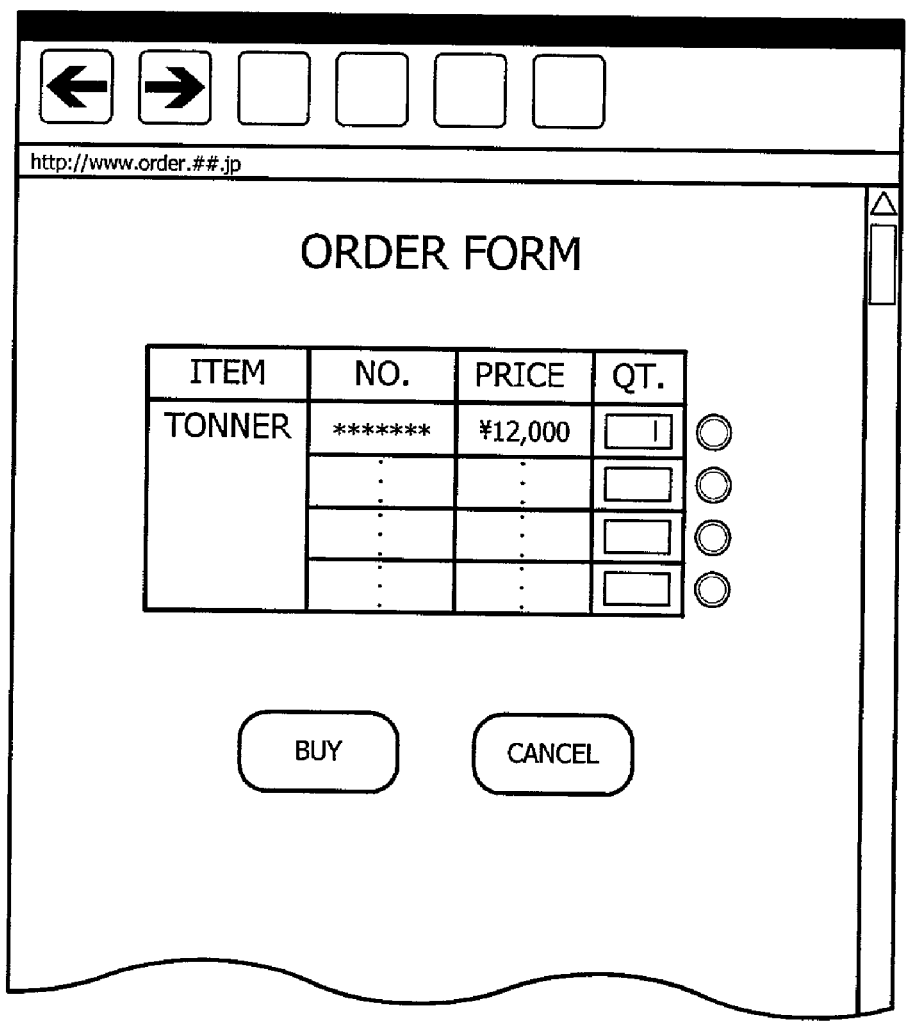
FIG. 28 is a diagram showing an example of a Web page to be provided in an information providing process shown in FIG. 27.

The OAS 130 creates web page data representing an order form page as shown in FIG. 28, for ordering the expendable supply, based on the information representing the expendable supply which is supplied in step S514. The OAS 130 assigns a predetermined URL (Uniform Resource Locator) to the order form page, and uploads the created data to appropriate storage area prepared for the Web site (Step S515). As illustrated in FIG. 28, the order form page includes a list of items corresponding to the expendable supply determined in step S405 that whose duration is equal to or less than the predetermined reference period.

If the recipient determined in step S511 is the purchaser (Step S516: Yes), then the OAS 130 provides the control unit 20 in the information controller 120 with information representing the URL assigned to the uploaded order form page (Step S517). In this case, the control unit 20 may store the provided information representing the URL, in an internal memory, or the like.

The control unit 20 accesses the suggestion-information database 24 to retrieve a suggestion file suggesting the purchaser (receiver) to purchase the corresponding expendable supply determined in step S405 that whose duration is equal to or less than the predetermined reference period (Step S518). The retrieved suggestion file includes text data representing that the corresponding expendable supply is available for the duration equal to or less than the predetermined reference period, and suggesting the purchaser to purchase the expendable supply to be replaced for the currently-used one.

The control unit 20 executes the CGI program and the like to create an e-mail including the URL information provided in step S517 and the suggestion message retrieved in step S518 (Step S519). FIG. 29 is a diagram showing an example of thus created e-mail. As shown in FIG. 29, the URL information (e.g. http://www.order.##.jp) which is assigned to the order form page uploaded in step S515 is displayed in the e-mail. The URL information is written in hyper text or the like, thus being linked to the order form page.

The control unit 20 controls the CCU 21 to send the created e-mail to the e-mail address of the purchaser specified in step S511 (Step S520).

On the contrary, if the e-mail receiver determined in step S511 is not the purchaser, i.e. if the recipient is the key operator (Step S516), then the flow jumps to step S513. The control unit 20 sends an e-mail suggesting the key operator to replace the currently-used expendable supply with a new one.

Figure 30:
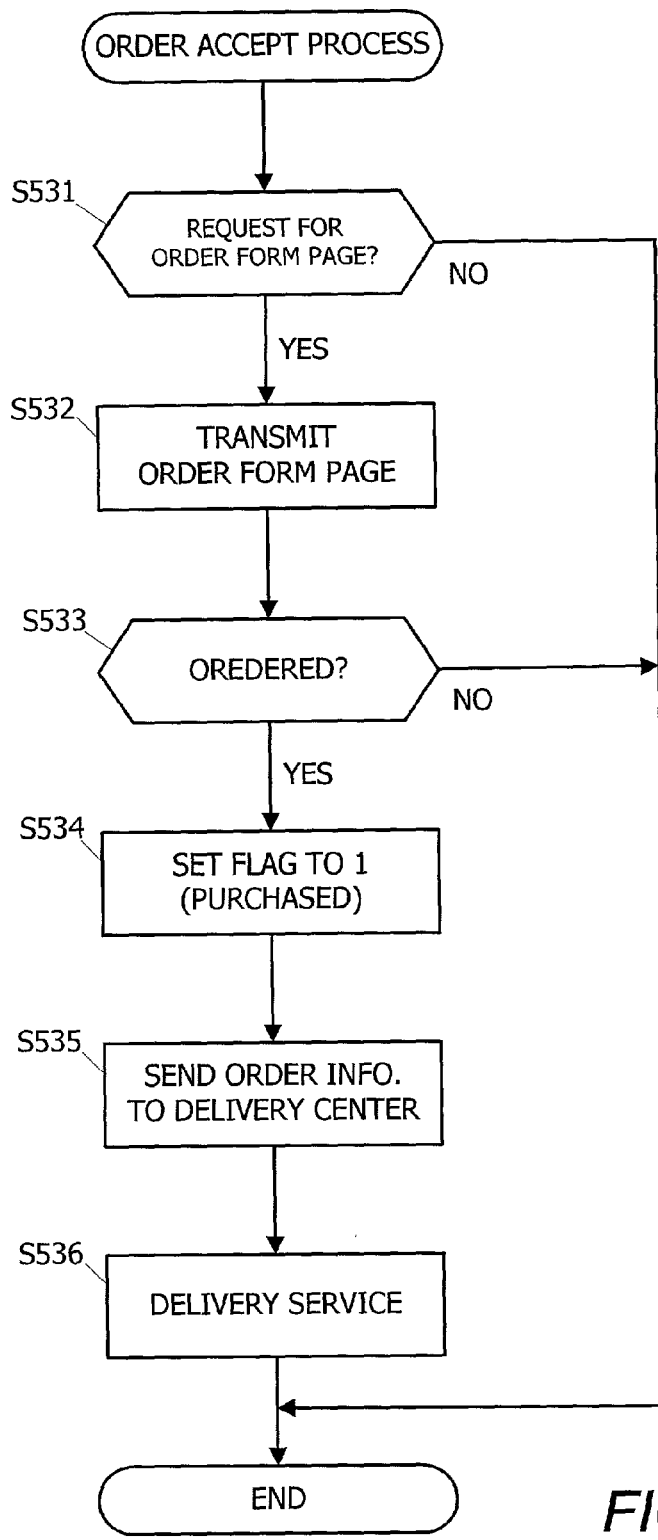
FIG. 30 is a flowchart for explaining the order accept process carried out by a system shown FIG. 25.

An ordering process for ordering expendable supply through the order form page created and uploaded in step S515 will now be described with reference to the flowchart shown in FIG. 30.

The customer receives the e-mail sent in step S520 by the terminal 500 or the like. If the customer wants to purchase expendable supply through the order form page, then he/she operates the terminal 500 and clicks the URL information shown in the received e-mail. Upon this operation, the terminal 500 transmits the URL information to the OAS 130. That is, the customer request for accessing the order form page (Step S531: Yes). If the customer does not send a request for transmission of the order form page (Step S531: No), then the process is terminated.

Upon receiving the request from the terminal 500, the OAS 130 sends web page data representing the order form page shown in FIG. 28, to the terminal 500 having sent the request for the order form page (Step S532).

The terminal 500 receives the web page data, and displays the order form page. The customer selects a desired item shown in the displayed order form page by selecting a corresponding radio button, etc., and inputs a desired number of the item(s) through a prepared text box or the like. If the customer wants to purchase the corresponding item, the he/she clicks "Purchase" button, thereby information representing the desired item and the number of each item (hereinafter referred to as "order information") is sent to the OAS 130 (Step S533: Yes). On the other hand, if the customer clicks "Cancel" button (Step S533: No), then the process is terminated.

Upon receipt of the order information from the terminal 500, the OAS 130 informs the control unit 10 of the information collector 110 that the instruction for ordering the expendable supply has been given. The control unit 10 accesses the customer-information database 12 to sets the purchase flag corresponding to the expendable supply concerned to "1", so as to indicate that order for the corresponding expendable supply is accepted, (that is, the item concerned is sold) (Step S534).

The OAS 130 sends the order information received in step S533 to the delivery center 150 through the private network 4 (Step S534).

Above receipt of the order information, the delivery center 150 carries out predetermined delivery service (Step S536), and the process is completed.

According to the above third embodiment, the customer is certainly informed about the timing for replenishing the expendable supply in the copier 300 by e-mail. In addition, the customer can purchase any desired expendable supply immediately upon receipt of the information representing the timing for replenishing the expendable supply, since the Web page for ordering the expendable supply is linked to the received e-mail.

Since the Web page for ordering the expendable supply is managed by the manufacturer/vendor of the copier 300, the customer can purchase genuine supplies (expendable supply, parts, and the like). As a result, the manufacturer/vendor can effectively promote reducing damages or troubles in the copier 300 caused by low quality third party supplies.

In the above third embodiment, likewise the second embodiment, the Web page including a message suggesting the customer to replace the currently-used expendable(s) with new one(s) may be provided to the customer having accessed the customer page. In this case, the Web page may be linked to the order form page for ordering the expendable supply.

Fourth Embodiment

In the third embodiment, the customer determines whether or not he/she purchases the expendable supply, every time the control unit 20 sends information representing the timing for replacing the expendable supply. The center 100 may automatically delivery the items to the customers who made contracts with the manufacturer/vendor (hereinafter, referred to as "quick delivery service"), in response to informing the customer about expendable supply replenishment.

Such operations carried out by the information collecting/providing system 2000 will now be described as a fourth embodiment in accordance with the present invention.

Since the information collecting process according to this embodiment may be the same as that according to the second embodiment, processes after the information collecting process will now be described. In this embodiment, the customer ID information stored in the customer ID database 22 also represents whether or not the customer made a contract for the quick delivery service.

Figure 31:
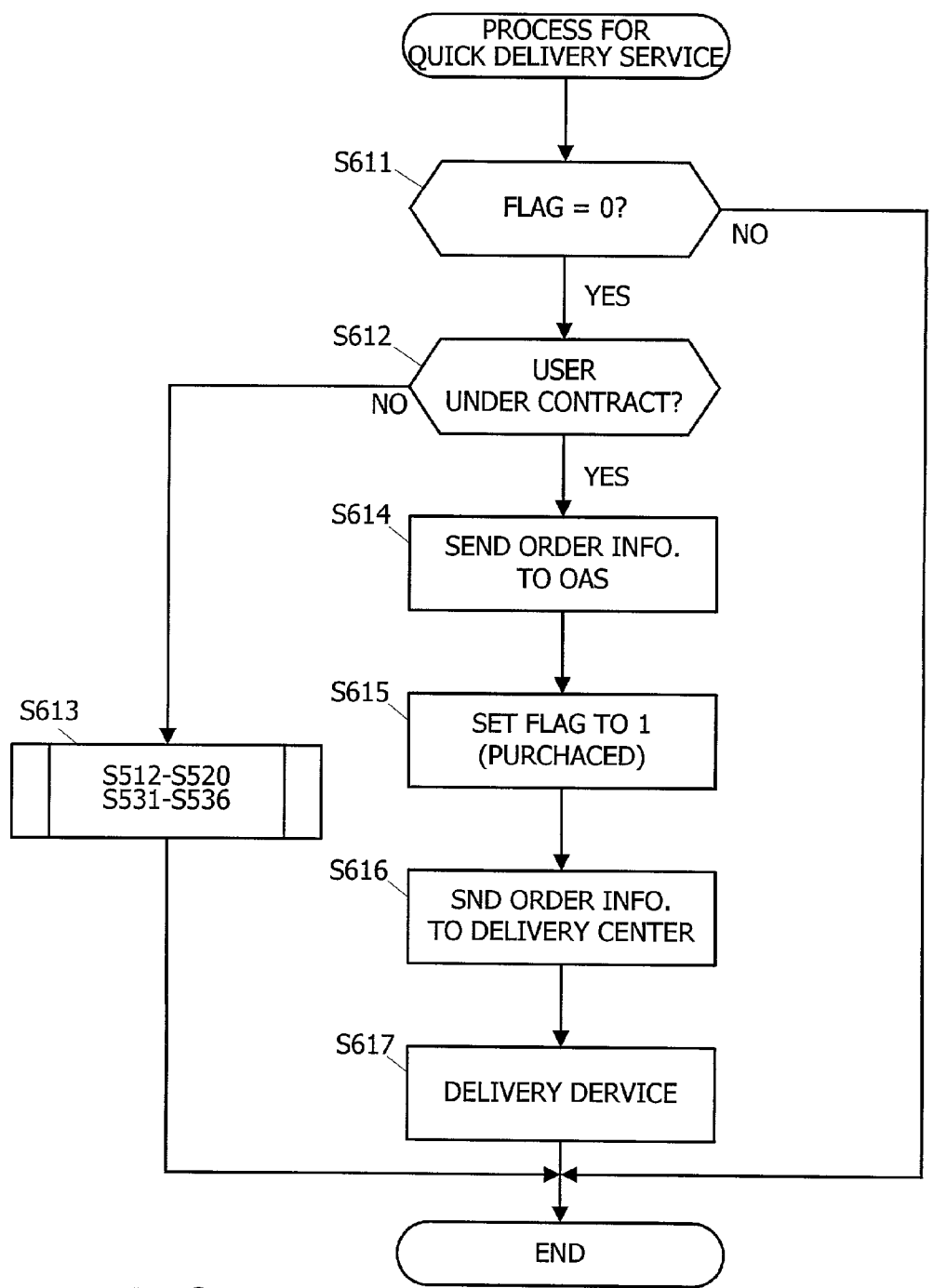
FIG. 31 is a flowchart for explaining quick delivery service carried out by a system according to a fourth embodiment of the present invention.

An automatic ordering process (Step S610) executed in this embodiment will now be explained with reference to the flowchart shown in FIG. 31.

The control unit 20 accesses the customer-information database 12 through the control unit 10 to determine whether the purchase flag corresponding to the expendable supply concerned indicates "0" (Step S611).

If it is determined that the purchase flag indicates "1", i.e. the expendable supply has already been purchased (Step S611: No), then the control unit 20 terminates the process.

On the contrary, if it is determined that the purchase flag indicates "0", (Step S611: Yes), then the control unit 20 accesses the customer ID database 22 to determine whether or not the customer of the copier 300 including the expendable supply concerned, made a contract with the company for the quick delivery service (Step S612).

If it is determined that the customer has not been under contract to the manufacturer/vendor (Step S312: No), then the control unit 20 executes the procedures of steps 512-520 and 531-536, that is, providing information by e-mail and accept orders (Step S613).

If it is determined that the customer has been under contract with the manufacturer/vendor (Step S612: Yes), then the control unit 20 provides the OAS 130 with information regarding the specified expendable supply (hereinafter referred to as "order information") (Step S614).

Upon receipt of the order information, the OAS 130 sends an acknowledge signal to the control unit 20. Upon receipt of the acknowledge signal, the control unit 20 accesses the customer-information database 12 through the control unit 10 to set the purchase flag corresponding to the specified expendable supply to "1" (Step S615).

The OAS 130 sends the order information received in step S614 to the delivery center 150 through the private network 4 (Step S616), and the delivery center 150 carries out a predetermined delivery service (Step S617).

According to the above fourth embodiment, the expendable, which is determined that whose duration is equal to or less than the predetermined reference period, is automatically delivered to the customer who made the contract with the company. In this structure, the customer receives the expendable supply without going through the ordering process.

In the above fourth embodiment, the explanation has been made to the cases where the expendable supply is a toner, ink cartridge, paper, photoconductor, as example. However, the present invention is applicable to order (purchase) any other parts. For example, the copier 300 may include sensors for detecting any breakdown or troubles of parts. Thus, the copier 300 is able to send warning signal to the center 100. Upon receipt of the warning signal, the center 100 may arrange the parts delivery. This structure is helpful for quick recovery, because the parts concerned are delivered to the customer soon after the trouble occurred.

In the above-described preferred embodiments, the explanations have been made to the case where the terminal 500 is a personal computer. However, the terminal 500 may be any other device which can receive e-mails and access and display the Web page through the Internet 3. For example, the terminal 500 may be a mobile communications terminal, such as a PDA (Personal Data Assistant), cellular phone, and the like.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Applications Nos. 2000-324324 filed on Oct. 24, 2000 and 2000-328810 filed on Oct. 27, 2000 and including specification, claims, drawings and summary. The disclosure of the above Japanese Patent Application is incorporated herein by reference in its entirety.

What is claimed is:

1. An information apparatus, comprising:
    a connector configured to connect the apparatus to a communications network,
    a first storage unit configured to store customer information, the customer information comprising information regarding a customer and information regarding a product used by the customer,
    a second storage unit configured to store product suggestion information,
    a first receiver configured to control the connector and receive product status information, the product status information representing a past or present state of the product used by the customer,
    a third storage unit configured to store the product status information received by the first receiver,
    a second receiver configured to control the connector and receive a request signal for requesting product suggestion information,
    a customer-authentication unit configured to identify a customer sending the request signal received by the second receiver based on customer information stored in the first storage unit,
    a status analyzer configured to retrieve from the third storage unit product status information of the product used by the customer specified by the customer-authentication unit and to analyze the retrieved product status information,
    a selector configured to select from the second storage unit product suggestion information relating to a future use of the product based on the analysis performed by the status analyzer, and
    a transmitter configured to control the connector and transmit to the customer the product suggestion information selected by the selector, wherein
    the product is configured to perform a plurality of functions,
    the product status information comprises usage frequency information indicating the frequency with which at least one of the functions is performed,
    the status analyzer analyzes status of functions having a relatively higher usage frequency, and
    the selector selects product suggestion information suggesting a product that is configured to optimally perform functions having a relatively higher usage frequency.

2. An information apparatus, comprising:
    a connector configured to connect the apparatus to a communications network,
    a first storage unit configured to store customer information, the customer information comprising information regarding a customer and information regarding a product used by the customer,
    a second storage unit configured to store product suggestion information, a first receiver configured to control the connector and receive product status information, the product status information representing a past or present state of the product used by the customer,
    a third storage unit configured to store the product status information received by the first receiver, a second receiver configured to control the connector and receive a request signal for requesting product suggestion information, a customer-authentication unit configured to identify a customer sending the request signal received by the second receiver based on customer information stored in the first storage unit, a status analyzer configure to retrieve from the third storage unit product status information of the product used by the customer specified by the customer-authentication unit and to analyze the retrieved product status information, a selector configured to select from the second storage unit product suggestion information relating to a future use of the product based on the analysis performed by the status analyzer, and a transmitter configured to control the connector and transmit to the customer the product suggestion information selected by the selector, wherein the product is configured to perform a plurality of functions, the product status information comprises usage frequency information indicating the frequency with which at least one of the functions is performed, the status analyzer analyzes status of functions having a relatively lower usage frequency, and the selector selects product suggestion information suggesting how to use the product to perform functions having a relatively lower usage frequency.

3. The apparatus of claim 1, wherein the product comprises an image data processor, the apparatus comprises a product-information storage unit configured to store product information comprising information representing performance level of the image data processor, the product status information represents an amount of process done by the image data processor, the status analyzer analyzes whether the amount of process exceeds a first level for the image data processor based on the performance level of the image data processor, and the selector selects the product suggestion information which suggests that the image data processor should be increased in number, when the status analyzer indicates that the amount of process exceeds the first level for the image data processor.

4. The apparatus of claim 1, wherein:

the product comprises an image data processor, the apparatus further comprises a product-information storage unit configured to stores product information comprising information representing performance level of the image data processor, the product status information represents the amount of process done by the image data processor, the status analyzer analyzes whether the amount of process exceeds a first level for the image data processor based on the performance level of the image data processor, and the selector selects the product suggestion information representing suggestion for upgrading the image data processor by replacing the image data processor with another image data processor which is configured to optimally perform the more frequently performed functions.

5. The apparatus of claim 1, wherein:

the product comprises an image data processor, the product status information represents consumption of an expendable element in the image data processor, the status analyzer analyzes the product status information to determine whether the expendable element should be replaced, and the selector selects the product suggestion information indicating that the expendable element should be replaced, and another product suggestion information representing an order form for buying new expendable element.

6. The apparatus of claim 1, wherein:

the product comprises an image data processor, the product status information represents consumption of expendable element in the image data processor, the status analyzer analyzes the product status information to determine whether the expendable element should be replaced with a new expendable element, and an ordering unit configured to controls the connector to transmit order information to a vendor of the expendable element, in a case where the result of analysis done by the status analyzer indicates that the expendable element should be replaced with a new expendable element.

* * * * *